US012583333B2

(12) United States Patent
Takeda

(10) Patent No.: US 12,583,333 B2
(45) Date of Patent: Mar. 24, 2026

(54) BATTERY-POWERED DOLLY

(71) Applicant: MAKITA CORPORATION, Anjo (JP)

(72) Inventor: Kouichi Takeda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 467 days.

(21) Appl. No.: 18/182,770

(22) Filed: Mar. 13, 2023

(65) Prior Publication Data

US 2023/0294523 A1 Sep. 21, 2023

(30) Foreign Application Priority Data

Mar. 18, 2022 (JP) ................................. 2022-044394

(51) Int. Cl.
| | |
|---|---|
| *B60L 15/20* | (2006.01) |
| *B60L 58/13* | (2019.01) |
| *B62B 3/12* | (2006.01) |
| *B62B 5/00* | (2006.01) |

(52) U.S. Cl.
CPC .......... *B60L 15/2018* (2013.01); *B60L 58/13* (2019.02); *B62B 3/12* (2013.01); *B62B 5/004* (2013.01); *B62B 5/0043* (2013.01); *B62B 5/0069* (2013.01); *B60L 2200/30* (2013.01); *B60L 2240/12* (2013.01); *B60L 2240/547* (2013.01); *B60L 2240/549* (2013.01); *B60L 2250/10* (2013.01)

(58) Field of Classification Search
CPC ............. B60L 15/2009; B60L 15/2018; B62B 5/0069; B62B 5/0073
See application file for complete search history.

(56) References Cited

U.S. PATENT DOCUMENTS

| | | | | |
|---|---|---|---|---|
| 9,650,061 | B2 * | 5/2017 | Katayama | ................. A61H 3/04 |
| 10,731,812 | B2 * | 8/2020 | Nashimoto | ............... B62B 3/12 |
| 10,889,312 | B2 * | 1/2021 | Casey | ..................... B62B 5/026 |
| 10,906,573 | B2 * | 2/2021 | Chung | .................. B62B 5/0073 |
| 11,513,532 | B2 * | 11/2022 | Park | ...................... B62B 5/0073 |
| 11,584,417 | B2 * | 2/2023 | Sa | ............................. G01L 5/22 |
| 11,592,815 | B2 * | 2/2023 | Armbrust | .................. B62B 3/00 |
| 12,172,689 | B2 * | 12/2024 | Matsuno | ............. B60L 15/2009 |
| 12,187,134 | B2 * | 1/2025 | Umemoto | ............. B62B 5/0404 |
| 2014/0244093 | A1 | 8/2014 | Sekine et al. | |

(Continued)

FOREIGN PATENT DOCUMENTS

| | | |
|---|---|---|
| JP | 2013-009608 A | 1/2013 |
| JP | 2016-007941 A | 1/2016 |

(Continued)

OTHER PUBLICATIONS

Oct. 7, 2025 Office Action issued in Japanese Patent Application No. 2022-044394.

*Primary Examiner* — Jeffrey J Restifo
(74) *Attorney, Agent, or Firm* — Oliff PLC

(57) ABSTRACT

A battery-powered dolly in one aspect of the present disclosure includes a handle, a connector, a motor, a wheel, a detector, a rotation information acquirer and a controller. The controller stops supplying an electric power from a battery to the motor based on (i) a battery current value and/or a battery voltage value detected by the detector and (ii) a rotation information acquired by the rotation information acquirer.

13 Claims, 30 Drawing Sheets

(56)                    References Cited

U.S. PATENT DOCUMENTS

| | | | |
|---|---|---|---|
| 2014/0264207 A1* | 9/2014 | Sekine .................. | B62B 5/0069 |
| | | | 254/2 C |
| 2018/0215404 A1* | 8/2018 | Hayashi .................. | B62B 5/004 |
| 2020/0262460 A1* | 8/2020 | Kim ...................... | B62B 5/0073 |
| 2022/0407397 A1* | 12/2022 | Takeda ................... | H02K 5/225 |
| 2023/0035700 A1* | 2/2023 | Iimura ................. | B62B 5/0069 |
| 2023/0097550 A1* | 3/2023 | Shibata ................ | B62B 5/0069 |
| | | | 180/332 |
| 2023/0294523 A1* | 9/2023 | Takeda ..................... | B62B 3/12 |
| | | | 180/65.1 |
| 2025/0010901 A1* | 1/2025 | Harada .................... | B62B 5/06 |

FOREIGN PATENT DOCUMENTS

| | | | |
|---|---|---|---|
| JP | 5860658 | B2 | 2/2016 |
| JP | 6039893 | B2 | 12/2016 |
| JP | 2018-122690 | A | 8/2018 |
| JP | 6864488 | B2 | 4/2021 |

\* cited by examiner

BATTERY-POWERED DOLLY

CROSS-REFERENCE TO RELATED APPLICATIONS

The present application claims the benefit of Japanese Patent Application No. 2022-044394 filed on Mar. 18, 2022 with the Japan Patent Office, the entire disclosure of which is incorporated herein by reference.

BACKGROUND

The present disclosure relates to a dolly driven by a motor.

Japanese Patent No. 6864488 discloses a dolly (wheelbarrow) with a motor. The dolly stops the motor when detecting that the motor is overloaded based on a conductive state of the motor, a rotational frequency of the motor, and a temperature of the motor.

SUMMARY

When an overloaded dolly climbs a slope and descends the slope, the dolly continues to accelerate if there is not enough braking force. Thus, when a user climbs a slope with an overloaded dolly, it is desirable that the motor being overloaded is detected and the motor is stopped. However, when the user performs a task with the overloaded dolly other than climbing a slope, detection of the motor being overloaded can unnecessarily stop the motor and interfere with the task. In addition, usability of the dolly may be impaired.

In one aspect of the present disclosure, it is desirable that an overloaded dolly, when climbing a slope, is stopped without sacrificing usability of the dolly.

A battery-powered dolly in one aspect of the present disclosure includes a handle, a connector, a motor, a wheel, a detector, a rotation information acquirer and a controller. The handle is configured to be gripped by a user of the battery-powered dolly. The connector is configured to be electrically connected to a battery. The motor is configured to receive an electric power from the battery connected to the connector and rotate. The wheel is configured to be driven by the motor. The detector is configured to detect a battery current value and/or a battery voltage value. The battery current value corresponds to a magnitude of an electric current flowing from the battery. The battery voltage value corresponds to a magnitude of an output voltage of the battery. The rotation information acquirer is configured to acquire a rotation information. The rotation information indicates a rotational state of the wheel. The controller is configured to control the motor. Further, the controller is configured to stop supplying the electric power from the battery to the motor based on (i) the battery current value and/or the battery voltage value detected by the detector and (ii) the rotation information acquired by the rotation information acquirer.

The above-described battery-powered dolly stops supplying the electric power from the battery to the motor based on (i) the battery current value and/or the battery voltage value and (ii) the rotational state of the wheel. When the overloaded battery-powered dolly climbs a slope, the wheel continues to rotate while the battery current value and/or the battery voltage value changes. On the other hand, when the motor is momentarily overloaded, the wheel does not continue to rotate while the battery current value and/or the battery voltage value changes. Accordingly, it is possible to confirm that the overloaded battery-powered dolly is climbing a slope based on (i) the battery current value and/or the battery voltage value and (ii) the rotational state of the wheel. In addition, without sacrificing usability of the battery-powered dolly, the motor can be stopped when the overloaded battery-powered dolly is climbing a slope.

A method for controlling a battery-powered dolly in another aspect of the present disclosure includes:

detecting a battery current value and/or a battery voltage value, the battery current value corresponding to a magnitude of an electric current flowing from a battery of the battery-powered dolly, the battery voltage value corresponding to a magnitude of an output voltage of the battery;

acquiring a rotation information, the rotation information indicating a rotational state of a wheel of the battery-powered dolly, the wheel being configured to be driven by a motor of the battery-powered dolly, the motor being configured to receive an electric power from the battery and rotate; and stopping supplying the electric power from the battery to the motor based on (i) the battery current value and/or the battery voltage value detected and (ii) the rotation information acquired.

The method exerts advantageous effects similar to those of the above-described battery-powered dolly.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Overview of Embodiment

Figure 1:
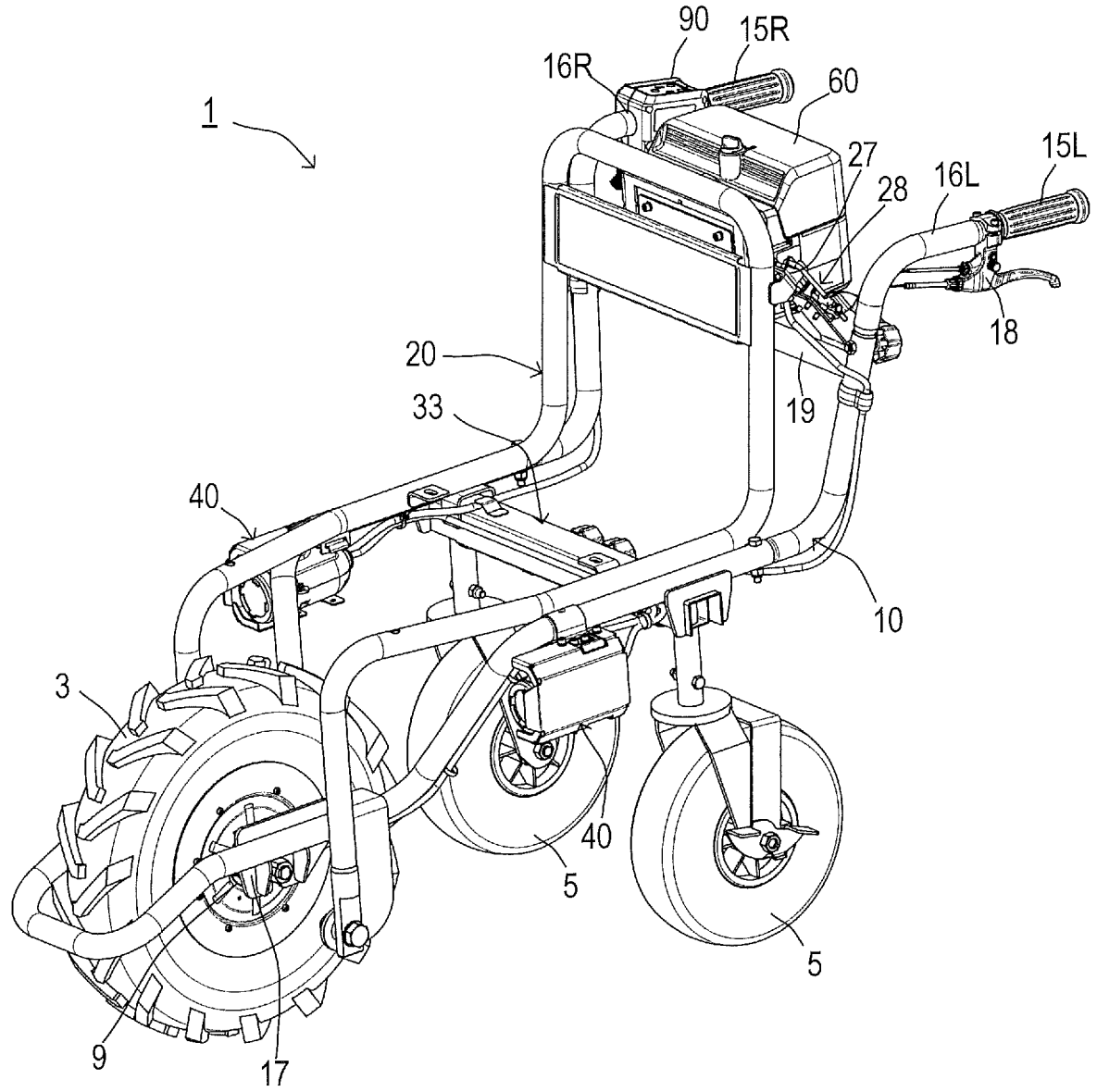
FIG. 1 is a perspective view showing a schematic configuration of a battery-powered dolly (wheelbarrow) according to the present embodiment.

A battery-powered dolly (wheelbarrow) according to an embodiment may include a handle, a connector, a motor, a wheel, a detector, a rotation information acquirer, and/or a controller. The handle may be gripped by a user of the battery-powered dolly. The connector may be electrically connected to a battery. The motor may receive an electric power from the battery connected to the connector and rotate. The wheel may be driven by the motor. The detector may detect a battery current value and/or a battery voltage value. The battery current value may correspond to a magnitude of an electric current flowing from the battery. The battery voltage value may correspond to a magnitude of an output voltage of the battery. The rotation information acquirer may acquire a rotation information. The rotation information may indicate a rotational state of the wheel. The controller may control the motor. The controller may stop supplying the electric power from the battery to the motor based on (i) the battery current value and/or the battery voltage value detected by the detector and (ii) the rotation information acquired by the rotation information acquirer.

In one embodiment, the detector may be configured to detect the battery current value. The controller may be configured to stop supplying the electric power to the motor based on a first requirement or a second requirement being satisfied. The first requirement may be satisfied in response to a first value based on the battery current value continuing to be greater than or equal to a first threshold while the wheel continuously rotates by a first angle. The second requirement may be satisfied in response to a second value based on the battery current value being greater than or equal to a second threshold. The second threshold may be greater than the first threshold.

The first requirement is satisfied in response to the motor being continuously overloaded while the overloaded battery-powered dolly climbs a slope. The second requirement is satisfied in response to an overcurrent that requires immediate protection of the motor flowing through the motor. Accordingly, the motor can be stopped both when the overloaded battery-powered dolly climbs a slope and when an overcurrent flows through the motor. In addition, it is possible to appropriately protect the user and the motor.

In one embodiment, the detector may detect the battery voltage value. The controller may (i) repeatedly acquire the battery voltage value detected by the detector and (ii) stop supplying the electric power to the motor based on each of a series of battery voltage values repeatedly acquired being smaller than or equal to a third threshold while the wheel continuously rotates by a first angle.

When the motor is overloaded, the battery current increases and an amount of voltage drop increases. As a result, the battery voltage value decreases. Thus, when the overloaded battery-powered dolly climbs a slope, the wheel continues to rotate while the battery voltage value is low. Accordingly, it is possible to confirm that the overloaded battery-powered dolly is climbing a slope based on the battery voltage value being continuously smaller than or equal to the third threshold.

In one embodiment, the battery-powered dolly may further include a notifier. The notifier may notify the user of low remaining energy of the battery. The detector may detect the battery voltage value. The controller may (i) repeatedly acquire the battery voltage value detected by the detector and (ii) notify the user of the low remaining energy via the notifier based on each of a series of battery voltage values repeatedly acquired being smaller than or equal to a fourth threshold while the wheel continuously rotates by a second angle.

When the battery-powered dolly climbs over a step, for example, the motor is momentarily overloaded. When the motor is momentarily overloaded, the battery voltage value temporarily drops, but then recovers. If the user is notified of low remaining energy in such cases, the user misunderstands that the battery needs to be charged although charging of the battery is not necessary. If the battery-powered dolly in one embodiment includes the notifier, the user is notified of low remaining energy based on the battery voltage value being continuously smaller than or equal to the fourth threshold. Thus, the user can confirm low remaining energy when the battery needs to be charged.

In one embodiment, the first angle may be greater than 360 degrees. If the motor is momentarily overloaded, a load applied to the motor decreases before the wheel rotates once. Accordingly, by setting the first angle to more than 360 degrees, such momentary overloads can be excluded and it is possible to accurately determine that the overloaded battery-powered dolly is climbing a slope.

In one embodiment, the controller may determine whether the wheel continuously rotates by the first angle based on the rotation information acquired by the rotation information acquirer.

The controller can determine whether the wheel continuously rotates by the first angle based on the rotation information.

In one embodiment, the controller may repeatedly acquire the battery current value detected by the detector. The controller may repeatedly calculate a first mean value. The first mean value may correspond to an average of a series of battery current values repeatedly acquired over a first period of time. The first value may correspond to each of a series of first mean values repeatedly calculated.

The controller can confirm that the overloaded battery-powered dolly is climbing a slope based on the first mean value.

In one embodiment, the controller may repeatedly acquire the battery current value detected by the detector. The controller may repeatedly estimate a motor current value based on a series of battery current values repeatedly acquired. The motor current value may correspond to a magnitude of an electric current flowing through the motor. The first value may correspond to each of a series of motor current values repeatedly estimated.

The controller can confirm that the overloaded battery-powered dolly is climbing a slope based on the motor current value.

In one embodiment, the controller may repeatedly acquire the battery current value detected by the detector. The controller may repeatedly estimate a motor current value based on a series of battery current values repeatedly acquired. The motor current value may correspond to a magnitude of an electric current flowing through the motor. The controller may repeatedly calculate a second mean value. The second mean value may correspond to an average of a series of motor current values repeatedly estimated over a first period of time. The first value may correspond to each of a series of second mean values repeatedly calculated.

The controller can confirm that the overloaded battery-powered dolly is climbing a slope based on the second mean value.

In one embodiment, the rotation information acquirer may include a position detection sensor. The position detection sensor may (i) detect a rotational position of the motor and (ii) output a first signal to the controller. The first signal may (i) correspond to the detected rotational position of the motor and (ii) include the rotation information.

The controller can acquire the rotational state of the wheel based on the rotational position of the motor detected by the position detection sensor.

In one embodiment, the battery-powered dolly may include a shaft coupled to the wheel. The rotation information acquirer may include a wheel speed sensor mounted on the shaft. The wheel speed sensor may (i) detect a rotational position of the wheel and (ii) output a second signal to the controller. The second signal may (i) correspond to the detected rotational position of the wheel and (ii) include the rotation information.

The controller can acquire the rotational state of the wheel based on the rotational position of the wheel detected by the wheel speed sensor.

In one embodiment, the notifier may include a buzzer.

The user can confirm a low remaining energy of the battery by sound.

In one embodiment, the notifier may include a light emitting diode.

The user can confirm a low remaining energy of the battery by light.

In one embodiment, a method for controlling a battery-powered dolly may be provided. The method may include:

detecting a battery current value and/or a battery voltage value, the battery current value corresponding to a magnitude of an electric current flowing from a battery of the battery-powered dolly, the battery voltage value corresponding to a magnitude of an output voltage of the battery;

acquiring a rotation information, the rotation information indicating a rotational state of a wheel of the battery-powered dolly, the wheel being configured to be driven by a motor of the battery-powered dolly, the motor being configured to receive an electric power from the battery and rotate; and stopping supplying the electric power from the battery to the motor based on (i) the battery current value and/or the battery voltage value detected and (ii) the rotation information acquired.

Execution of the method can exert advantageous effects similar to the above-described battery-powered dolly.

In one embodiment, the above-described features may be combined in any manner. In one embodiment, any of the above-described features may be deleted.

Specific Example Embodiment

Hereinafter, an embodiment of the present disclosure will be described with reference to the drawings.

<1. Configuration>

<1-1. Overall Configuration>

Referring to FIG. 1, a configuration of a battery-powered dolly 1 according to the present embodiment will be described. The battery-powered dolly 1 includes a front wheel 3 and two rear wheels 5. The front wheel 3 is a drive wheel, and the rear wheels 5 are driven wheels. At least one of the front wheel 3 and the two rear wheel 5 may be deleted.

The battery-powered dolly 1 includes a motor device 9. The motor device 9 includes a motor 400 (see FIG. 4A). The motor 400 is a three-phase brushless motor. The battery-powered dolly 1 also includes a gear 420 (see FIG. 4A). A rotation shaft of the motor 400 is physically coupled to the front wheel 3 via the gear 420, and the motor 400 transmits a rotational force to the front wheel 3. In other words, the front wheel 3 is driven by the motor 400.

Figure 4A:
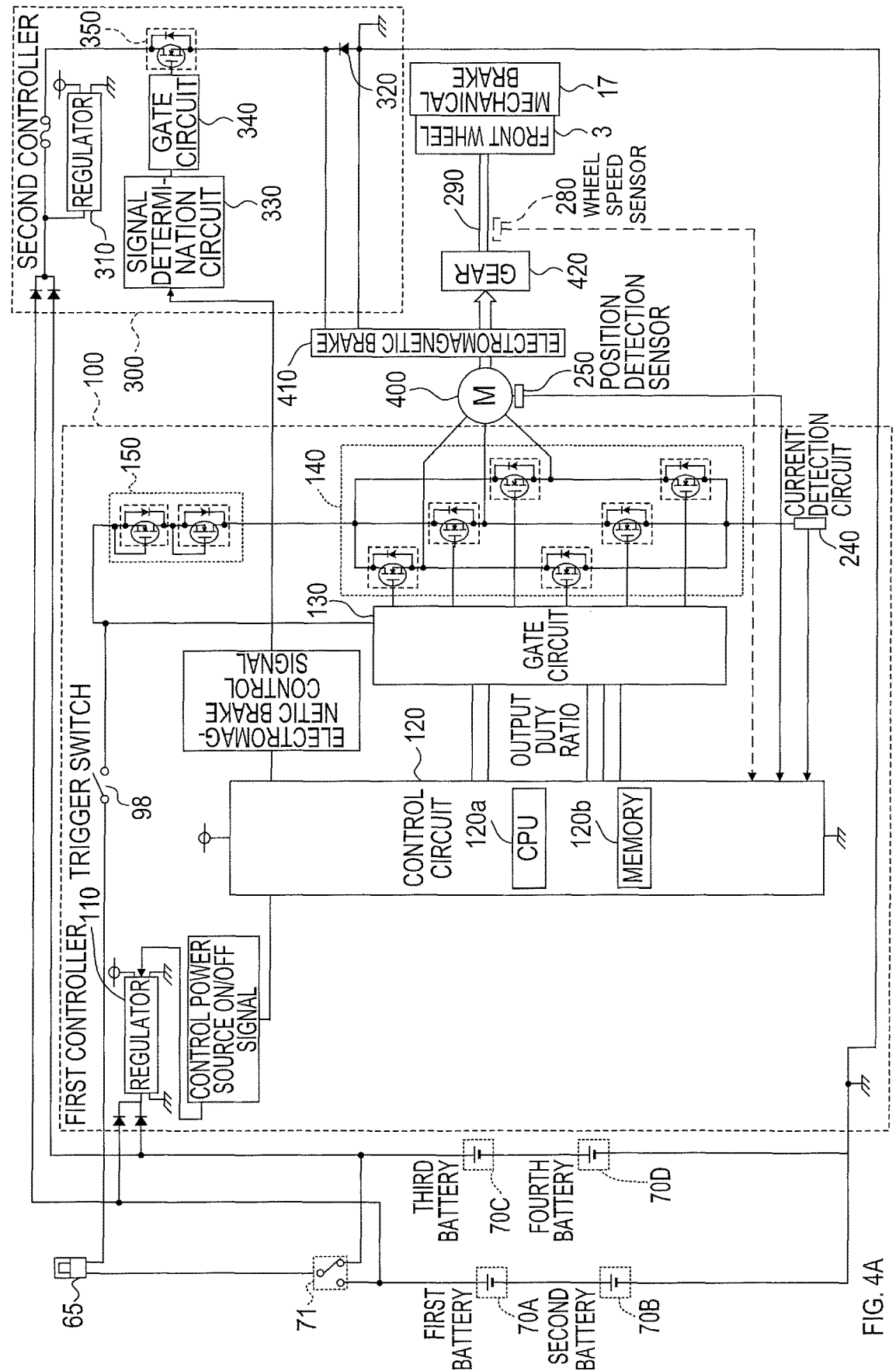
FIG. 4A is a block diagram showing an electrical configuration of the battery-powered dolly according to the present embodiment.

The motor device 9 includes a position detection sensor 250 (see FIG. 4A). The position detection sensor 250 includes three Hall sensors, each of which is provided on one of windings of three phases. The position detection sensor 250 detects a rotor position of the motor 400, and outputs a position signal to a later-described control circuit 120. The control circuit 120 detects a rotational state of the motor 400 based on the position signal. The rotational state of the motor 400 corresponds to a rotational state of the front wheel 3. In the present embodiment, the position detection sensor 250 corresponds to one example of a rotation information acquirer of the present disclosure.

The motor device 9 includes an electromagnetic brake 410 (see FIG. 4A). The electromagnetic brake 410 includes, for example, a brake stator, a brake plate, an armature, and a brake rotor. The brake stator includes an electromagnetic coil therein. The brake rotor is fixed to the rotation shaft of the motor 400. The electromagnetic brake 410 is turned ON when electric power to the electromagnetic brake 410 is interrupted, and applies a braking force to rotation of the brake rotor. In addition, the braking force is applied to rotation of the rotation shaft of the motor 400. The electromagnetic brake 410 is turned OFF when electric power is supplied to the electromagnetic brake 410, and does not apply the braking force to the rotation of the brake rotor. In addition, the braking force is not applied to the rotation of the rotation shaft of the motor 400. If the electromagnetic brake 410 transmits the braking force to the motor 400 when the rotation speed of the motor 400 is high, the electromagnetic brake 410 may fail. Accordingly, when the rotation speed of the motor 400 is sufficiently low, the electromagnetic brake 410 is turned ON.

The battery-powered dolly 1 includes a body frame 10. The body frame 10 rotatably supports the front wheel 3. The body frame 10 is formed by bending a rod-shaped pipe material made of metal. The body frame 10 has a symmetrical shape across the front wheel 3 on the right and left sides about a plane of rotation of the front wheel 3.

The body frame 10 has a right handle 16R at its right end. The body frame 10 has a left handle 16L at its left end. The right handle 16R and the left handle 16L are substantially horizontal to the ground. A right grip 15R is attached to an end part of the right handle 16R. A left grip 15L is attached to an end part of the left handle 16L. The user grips the right grip 15R and the left grip 15L and pushes forward or pulls backward the battery-powered dolly 1. The front wheel 3 rotates not only by a driving force of the motor 400 but also by the user pushing or pulling the battery-powered dolly 1.

The battery-powered dolly 1 includes a mechanical brake 17. The mechanical brake 17 directly transmits a braking force to the front wheel 3. A brake lever 18 is disposed on the left handle 16L. The brake lever 18 is manually operated by the user. When the user pulls the brake lever 18, the mechanical brake 17 is turned ON, and a brake pad included in the mechanical brake 17 is pressed against the front wheel 3. As a result, the braking force by friction between the front wheel 3 and the brake pad is applied to the front wheel 3. When the user releases the brake lever 18, the mechanical brake 17 is turned OFF and the brake pad moves away from the front wheel 3. As a result, the braking force due to the friction dies away. Also, when the brake lever 18 is pulled, a mechanical brake switch (not shown) is turned ON and a mechanical brake signal that indicates ON is output.

The battery-powered dolly 1 includes a container support frame 20. Various types of containers for carrying loads are fixed to the body frame 10 via the container support frame 20. The container support frame 20 is formed by bending a rod-shaped pipe material made of metal. The body frame 10 has a symmetrical shape across the front wheel 3 on the right and left sides about the plane of rotation of the front wheel 3.

The battery-powered dolly 1 includes a rear wheel frame 33. The rear wheel frame 33 is provided between a right side frame and a left side frame of the body frame 10. The container support frame 20 is mounted on the rear wheel frame 33. The rear wheel frame 33 rotatably supports the two rear wheels 5. Further, the rear wheel frame 33 slidably supports the two rear wheel 5 in left-right directions. Accordingly, the user can adjust spacing between the two rear wheels 5. The two rear wheels 5 are fixed to the rear wheel frame 33 by a securing member at positions with the spacing adjusted.

The battery-powered dolly 1 includes two obstacle detectors 40. One of the two obstacle detectors 40 is provided on the right side frame and the other is provided on the left side frame of the body frame 10. Each of the two obstacle detectors 40 includes an ultrasonic sensor. The ultrasonic sensor emits ultrasonic waves toward the front of the battery-powered dolly 1, and receives reflected waves generated by the emitted ultrasonic waves reflecting off an obstacle in front. The ultrasonic sensor detects presence or absence of an obstacle and a distance to the obstacle based on the received reflected waves. Each of the two obstacle detectors 40 may include a laser radar instead of the ultrasonic sensor, or may include an infrared sensor.

The battery-powered dolly 1 includes an operation device 90. The operation device 90 is provided on the right handle 16R. The user manipulates the operation device 90 to set a drive requirement of the motor 400 and input a drive command of the motor 400.

The battery-powered dolly 1 includes a battery box 60. The battery box 60 is fixed to the body frame 10 via a securing frame 19, and disposed between the right handle 16R and the left handle 16L. The battery box 60 accommodates first to fourth battery packs 70A to 70D. The first to fourth battery packs 70A to 70D include first and second battery sets. Each of the first and second battery sets has two battery packs. A selected one of the first and second battery sets is electrically connected to the motor 400, and supplies an electric power to the motor 400.

<1-2. Configuration of Operation Device>

Figure 2:
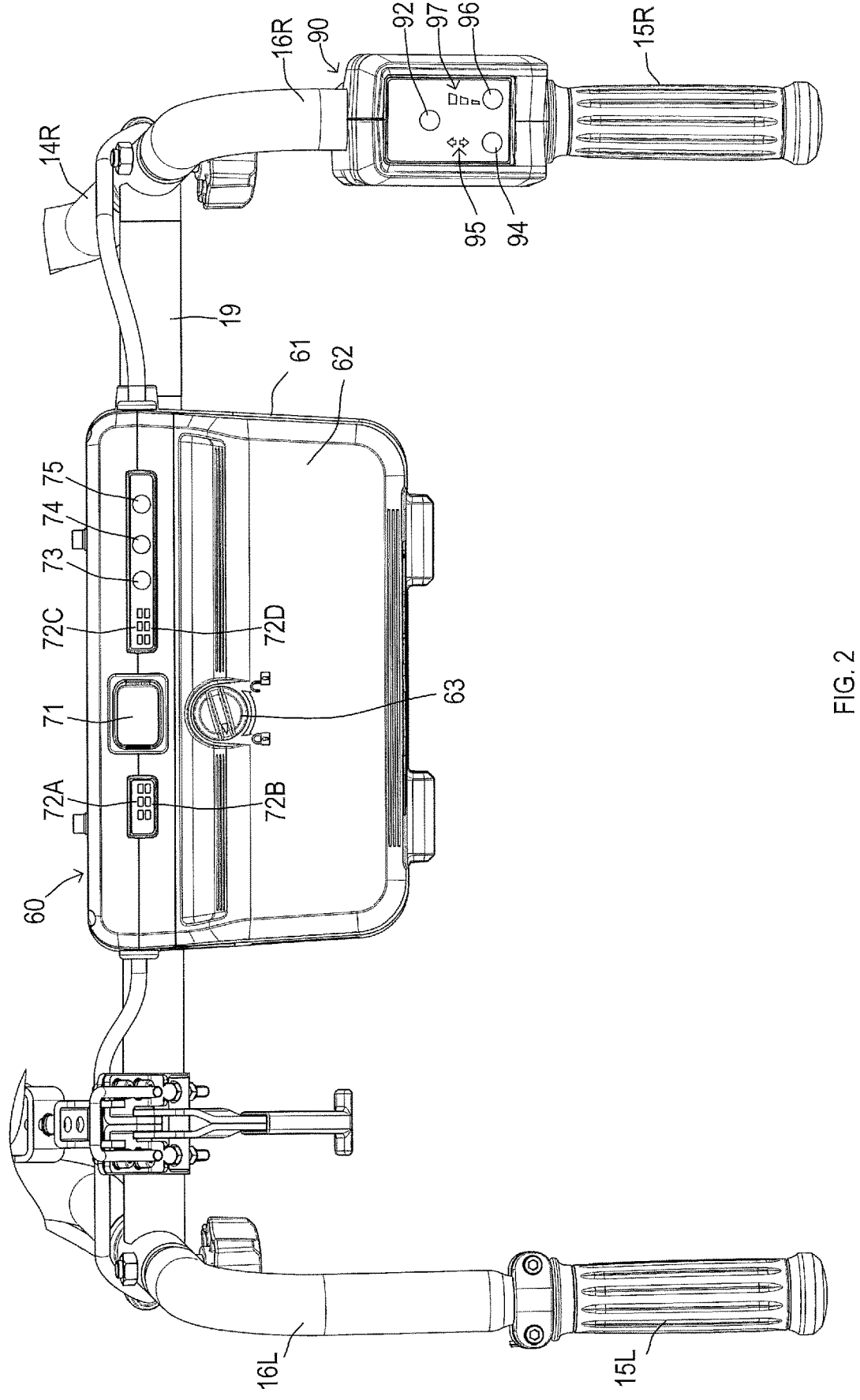
FIG. 2 is a plan view of left and right handles and a battery box of the battery-powered dolly according to the present embodiment, when viewed from above.
Figure 3:
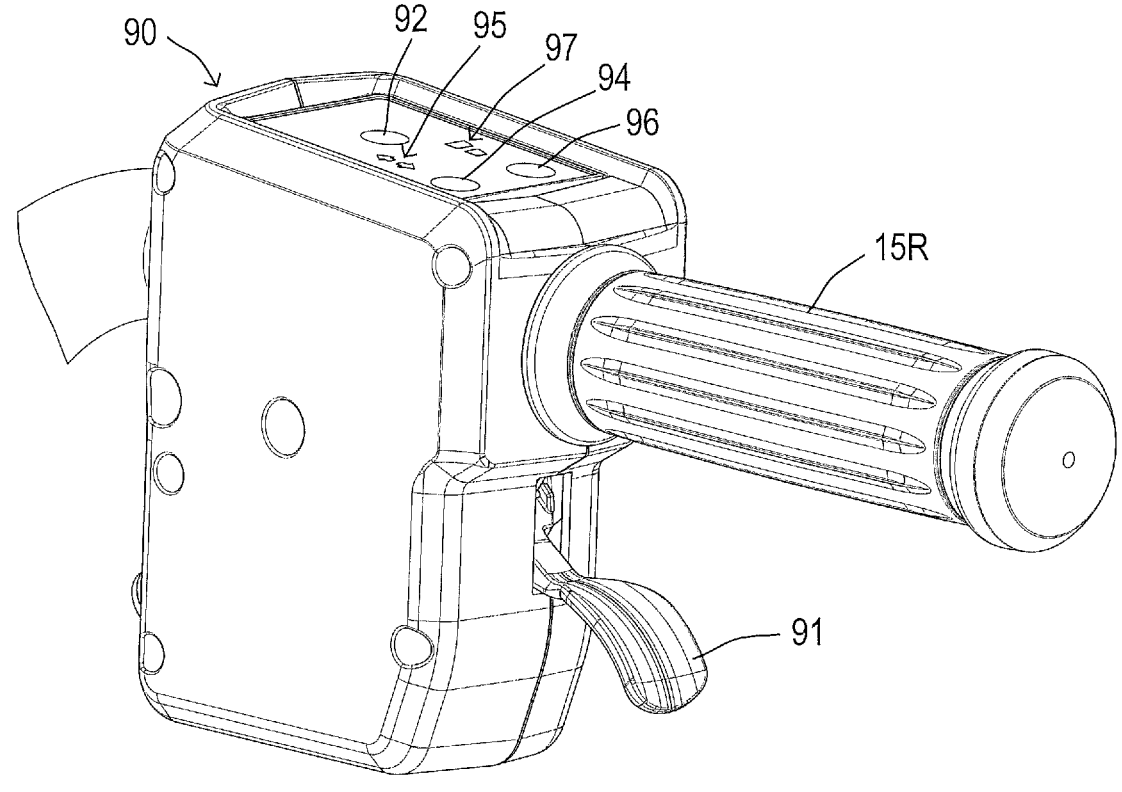
FIG. 3 is a perspective view showing an appearance of an operation device provided at the right handle of the battery-powered dolly according to the present embodiment.

Referring to FIGS. 2 and 3, the configuration of the operation device 90 will be described in detail. The operation device 90 has a substantially rectangular shape. The operation device 90 includes a drive lever 91. The drive lever 91 corresponds to a trigger. The user manipulates the drive lever 91 with a right hand gripping the right grip 15R. When the user pulls the drive lever 91, the trigger switch 98 is brought into a conductive state (that is, turned ON), and, when the user releases the drive lever 91, the trigger switch 98 is brought into a non-conductive state (that is, turned OFF). As shown in FIG. 4A, the trigger switch 98 is on a positive electrode line. The positive electrode line connects a positive electrode of a motor driver 140 to a positive electrode of the first or second battery set. The motor driver 140 is a circuit for controlling an electric current flowing through the motor 400. Also, the user sets (or commands) a rotational frequency of the motor 400 by an amount the drive lever 91 is pulled. The larger the pulled amount is, the higher rotational frequency is set.

The operation device 90 includes a main power switch 92. Each time the user manipulates the main power switch 92, a control power source is switched between ON and OFF. The main power switch 92 outputs a main power signal that indicates ON in response to the user manipulating the main power switch 92, and outputs the main power signal that indicates OFF in response to the user not manipulating the main power switch 92.

The operation device 90 includes a traveling direction selector switch 94. Each time the user manipulates the traveling direction selector switch 94, a traveling direction of the battery-powered dolly 1 (that is, rotation direction of the motor 400) to be set is switched. The traveling direction to be set is either forward or backward. The traveling direction selector switch 94 outputs a traveling direction selector signal that indicates ON in response to the user manipulating the traveling direction selector switch 94, and outputs the traveling direction selector signal that indicates OFF in response to the user not manipulating the traveling direction selector switch 94.

The operation device 90 includes a traveling direction indicator 95. The traveling direction indicator 95 displays the traveling direction of the battery-powered dolly 1 set via the traveling direction selector switch 94. Specifically, the traveling direction indicator 95 includes an arrow indicator that indicates "forward" and an arrow indicator that indicates "backward". Each of the arrow indicators includes a light emitting diode (LED). The arrow indicator corresponding to the set traveling direction is turned ON.

The operation device 90 includes a speed selector switch 96. Each time the user manipulates the speed selector switch 96, a speed mode to be set is switched. The speed mode to be set is one of high-speed mode, medium speed mode and low-speed mode, and is sequentially switched from low-speed mode to medium speed mode, then to high-speed mode, and then to low-speed mode. The speed selector switch 96 outputs a speed selector signal that indicates ON in response to the user manipulating the speed selector switch 96, and outputs the speed selector signal that indicates OFF in response to the user not manipulating the speed selector switch 96.

A target rotational frequency of the motor 400 is set by multiplying an upper-limit speed defined in accordance with the speed mode by a ratio. The ratio corresponds to a distance the drive lever 91 (that is, trigger) is actually pulled to a maximum distance the drive lever 91 can be pulled. The upper-limit speed in high-speed mode is greater than the upper-limit speed in medium speed mode. The upper-limit speed in medium speed mode is greater than the upper-limit speed in low-speed mode.

The speed mode indicator 97 displays the speed mode set via the speed selector switch 96. The speed mode indicator 97 includes an LED and displays the speed mode in three stages.

<1-3. Configuration of Battery Box>

Referring to FIG. 2, the battery box 60 will be described. The battery box 60 includes a box body 61. The box body 61 is formed into a substantially rectangular shape with an open top surface. The box body 61 accommodates the first to fourth battery packs 70A to 70D therein. Each of the first to fourth battery packs 70A to 70D includes a battery with a plurality of cells coupled in series. Each battery is a rechargeable battery, for example, a lithium ion battery.

The first battery pack 70A is coupled in series with the second battery pack 70B. The first battery set includes the first and second battery packs 70A, 70B coupled in series. The third battery pack 70C is coupled in series with the fourth battery pack 70D. The second battery set includes the third and fourth battery packs 70C, 70D coupled in series. The battery box 60 includes a lid 62. The lid 62 is rotatably attached to the box body 61 via a hinge, and opens and closes the top surface of the box body 61.

The battery box 60 includes a lock mechanism 63. The lock mechanism 63 is mounted on the lid 62. The lock mechanism 63 is configured to be rotatable between locked and unlocked positions. When the lock mechanism 63 is located in the locked position, the lid 62 remains closed and fixed. When the lock mechanism 63 is located in the unlocked position, the lid 62 can be opened.

The battery box 60 includes a battery selector switch 71. The battery selector switch 71 is mounted on the lid 62. The user manipulates the battery selector switch 71 to select either the first battery set or the second battery set. The selected battery set of the first and the second battery sets is electrically connected to the motor 400. The battery selector switch 71 outputs a battery selector signal that indicates the selected battery set.

The battery box 60 includes first to fourth remaining energy indicators 72A to 72D. The first to fourth remaining energy indicators 72A to 72D are mounted on the lid 62. The first to fourth remaining energy indicators 72A to 72D respectively display remaining energies of the first to fourth battery packs 70A to 70D. Each of the first to fourth remaining energy indicators 72A to 72D includes three LEDs arranged in a row and displays the remaining energy by the number of LEDs that light up.

The battery box 60 includes a remaining energy indicator switch 73. The remaining energy indicator switch 73 is mounted on the lid 62. When the user depresses the remaining energy indicator switch 73, a display command of the remaining energy is output to the later-described control circuit 120. As a result, regardless of which of the first and second battery sets is selected, the remaining energies of the first to fourth battery packs 70A to 70D are displayed on the first to fourth remaining energy indicators 72A to 72D for a given length of time.

The battery box 60 includes a collision avoidance switch 74 and a collision avoidance indicator 75. The collision avoidance switch 74 and the collision avoidance indicator 75 are mounted on the lid 62. Each time the user depresses the collision avoidance switch 74, execution of avoidance control by the control circuit 120 is switched between "permitted" and "prohibited". The control circuit 120 executes the avoidance control and controls driving of the motor 400 to decelerate or stop the motor 400 in response to detection of an obstacle by the obstacle detectors 40. The collision avoidance indicator 75 displays whether execution of the avoidance control is permitted or prohibited.

The battery box 60 includes a key slot 65 in the box body 61. As shown in FIG. 4A, the key slot 65 is disposed between the first and second battery sets and the trigger switch 98. When a key is inserted to the key slot 65 and the drive lever 91 is pulled, the positive electrode line is completed.

<1-4. Circuit Configuration>

Figure 4B:
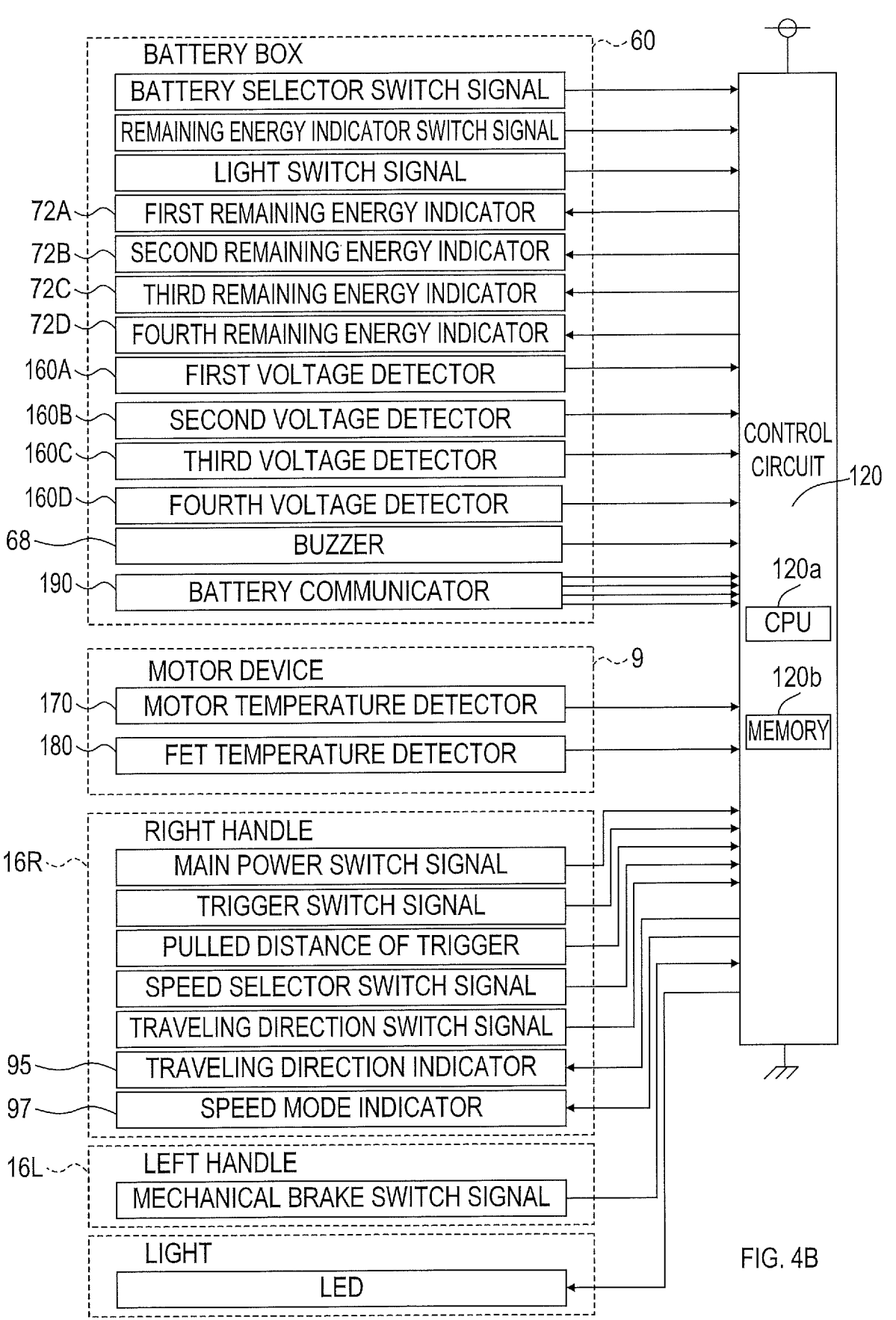
FIG. 4B is a block diagram showing input/output of a control circuit of the battery-powered dolly according to the present embodiment.

As shown in FIG. 4B, the battery-powered dolly 1 includes first to fourth voltage detectors 160A to 160D. The first to fourth voltage detectors 160A to 160D are accommodated in the battery box 60. The first to fourth voltage detectors 160A to 160D respectively detect the voltage values of the first to fourth battery packs 70A to 70D and output detection signals that indicate the detected voltage values to the later-described control circuit 120. The first to fourth voltage detectors 160A to 160D always detect the voltage values of the battery packs that are not selected by the battery selector switch 71 as well.

The battery-powered dolly 1 includes a battery communicator 190. The battery communicator 190 is accommodated in the battery box 60. The control circuit 120 communicates with each of the first to fourth battery packs 70A to 70D via the battery communicator 190. Specifically, the control circuit 120 performs serial communication with the first to fourth battery packs 70A to 70D via the battery communicator 190. Then, the control circuit 120 receives information from each of the first to fourth battery packs 70A to 70D on whether a discharge from the battery pack to the battery-powered dolly 1 is permitted or prohibited. Alternatively, the control circuit 120 receives a discharge permission signal or a discharge prohibition signal from each of the first to fourth battery packs 70A to 70D via the battery communicator 190.

The battery-powered dolly 1 includes a motor temperature detector 170. The motor temperature detector 170 is accommodated in the motor device 9. The motor temperature detector 170 detects a temperature of the motor 400 and outputs a detection signal that indicates the detected temperature to the control circuit 120.

The battery-powered dolly 1 includes a Field Effect Transistor (FET) temperature detector 180. The FET temperature detector 180 is accommodated in the motor device 9. The FET temperature detector 180 detects a temperature of later-described gate circuit 130 and motor driver 140, and outputs detection signals that indicate the detected temperature to the control circuit 120.

As shown in FIG. 4A, the battery-powered dolly 1 includes a first controller 100. The first controller 100 is accommodated in the motor device 9 and controls driving of the motor 400.

The first controller 100 includes a regulator 110. The regulator 110 is coupled to the first and second battery sets via a diode. The regulator 110, when a power control signal set to ON is input from the later-described control circuit 120, receives the electric power from the first and/or the second battery set, and generates a power source to be supplied to various circuits provided in the first controller 100.

The first controller 100 includes the control circuit 120. The control circuit 120 includes a CPU 120a and a memory 120b. The memory 120b may have, for example, a semiconductor memory such as a ROM, a RAM, a NVRAM, and a flash memory. That is, the first controller 100 of the present embodiment may be in the form of a microcomputer.

The control circuit 120 implements various functions by executing programs stored in a non-transitory tangible storage medium. In the present embodiment, the memory 120b corresponds to a non-transitory tangible storage medium that stores programs. In the present embodiment, the various programs are stored in the memory 120b.

Some or all of the various functions of the control circuit 120 may be implemented by execution of a program (that is, by software processing), or may be implemented by one or more hardware. For example, the control circuit 120 may include, in place of or in addition to the microcomputer, a logic circuit that includes a plurality of electronic components, an application specific IC such as ASIC and/or ASSP, or a programmable logic device such as, for example, FPGA, which can build optional logic circuits.

The first controller 100 includes the motor driver 140. The motor driver 140 is a three-phase full-bridge circuit that includes six FETs. The motor driver 140 is connected to the positive electrode line and the motor 400, and controls the electric current flowing through the motor 400.

The first controller 100 includes the gate circuit 130. The gate circuit 130 turns ON or OFF the six FETs of the motor driver 140 based on a control signal output from the control circuit 120.

The first controller 100 includes an anti-regeneration circuit 150. The anti-regeneration circuit 150 is disposed on the positive electrode line, and between the trigger switch 98 and the motor driver 140. The anti-regeneration circuit 150 includes two reverse flow inhibiting elements, and inhibits a regenerative current from flowing from the motor driver 140 through a positive electrode of the first or second battery set.

The first controller 100 includes a current detection circuit 240. The current detection circuit 240 detects a value of a current flowing from the battery set through the motor 400 (hereinafter, referred to as battery current value). The current detection circuit 240 outputs a detection signal that indicates the detected battery current value to the control circuit 120.

As shown in FIG. 4B, the control circuit 120 acquires switch signals from the battery selector switch 71, the remaining energy indicator switch 73, a light switch (not shown), the main power switch 92, the trigger switch 98, the speed selector switch 96, the traveling direction selector switch 94, and the mechanical brake switch. Also, the control circuit 120 acquires a distance the drive lever 91 is pulled (hereinafter, pulled distance of the trigger) from the drive lever 91. The control circuit 120 controls driving of the regulator 110 and a lighting LED 210, and controls displays of the respective indicators and an output of the buzzer 68, based on the acquired respective switch signals, the pulled distance of the trigger and the respective detection signals. The buzzer 68 is mounted on the battery box 6.

Further, the control circuit 120, based on the respective switch signals, the pulled distance of the trigger and the respective detection signals, generates a motor control signal, and outputs the generated motor control signal to the gate circuit 130. In the present embodiment, the motor control signal is a pulse width modulation control signal (PWM signal).

The battery-powered dolly 1 includes a second controller 300. The second controller 300 is accommodated in the motor device 9, and controls the electromagnetic brake 410. The second controller 300 is coupled to the control circuit 120 and the electromagnetic brake 410.

The second controller 300 includes a regulator 310. The regulator 310 receives the electric power of the first and/or second battery set, and generates a power source to be supplied to various circuits included in the second controller 300.

The second controller 300 includes a signal determination circuit 330. The signal determination circuit 330 receives an electromagnetic brake control signal from the control circuit 120. For example, the electromagnetic brake control signal has two values, one of which corresponds to ON of the electromagnetic brake 410, and the other of which corresponds to OFF of the electromagnetic brake 410. The signal determination circuit 330 determines which of ON and OFF of the electromagnetic brake 410 the electromagnetic brake control signal corresponds to, and outputs a determination signal that indicates a determination result.

The second controller 300 includes a gate circuit 340. The gate circuit 340 is connected to the signal determination circuit 330 and receives the determination signal from the signal determination circuit 330.

The second controller 300 includes a switching element 350 and a diode 320. In the present embodiment, the switching element 350 is an n-channel MOSFET. To a drain of the switching element 350, a voltage of the first and/or second battery set is applied. To a source of the switching element 350, the electromagnetic brake 410 is connected. A gate of the switching element 350 is connected to the gate circuit 340. An anode of the diode 320 is connected to a ground line, and a cathode of the diode 320 is connected to the source of the switching element 350.

The gate circuit 340 turns ON or OFF the switching element 350 in accordance with the determination signal. When the switching element 350 is ON, the electric power is supplied to the electromagnetic brake 410, and braking by the electromagnetic brake 410 is deactivated. When the switching element 350 is OFF, the electric power to the electromagnetic brake 410 is interrupted, and braking by the electromagnetic brake 410 is activated. The gate circuit 340 turns OFF the switching element 350 when the determination signal corresponds to ON of the electromagnetic brake 410. The gate circuit 340 turns ON the switching element 350 when the determination signal corresponds to OFF of the electromagnetic brake 410.

<2. Main Process>

Figure 5:
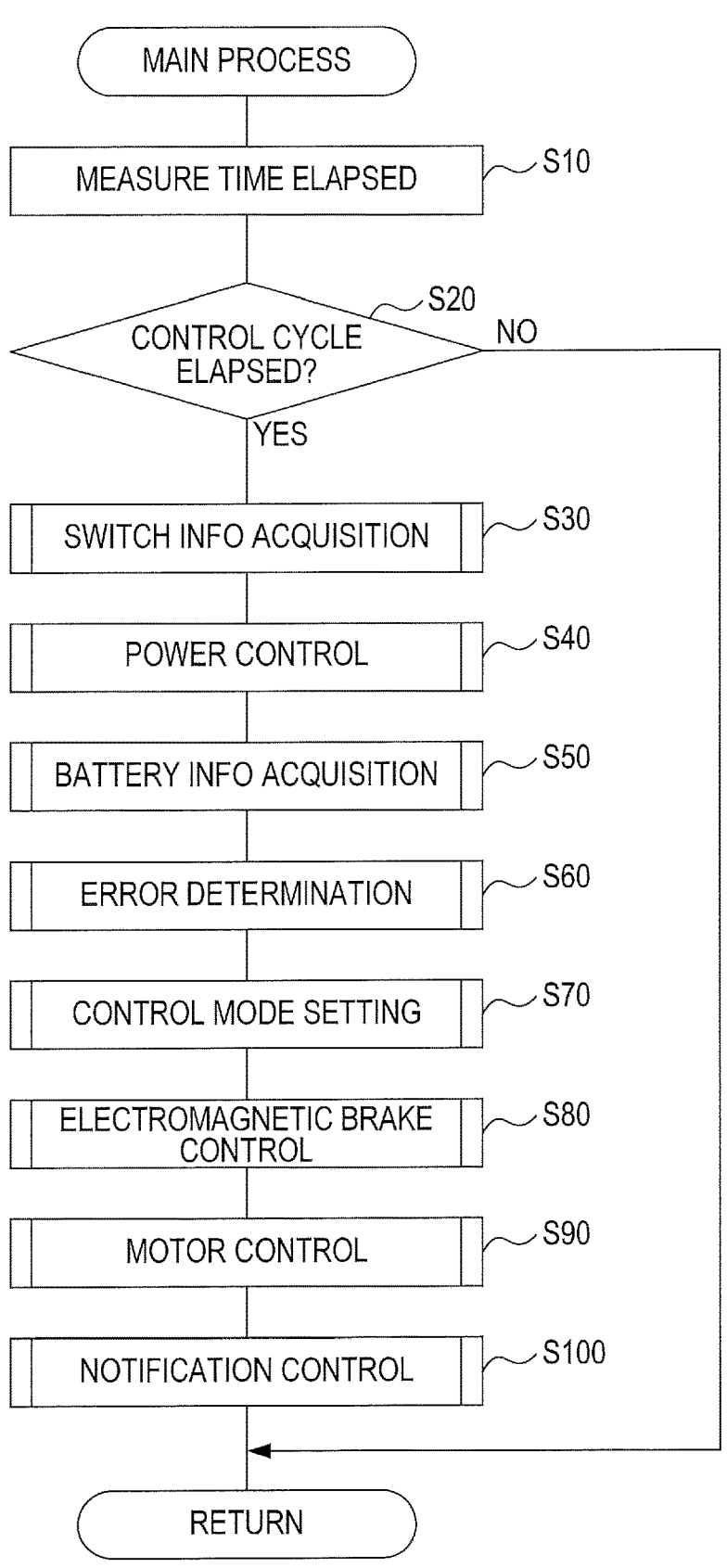
FIG. 5 is a flowchart showing a main process according to the present embodiment.

Next, referring to a flowchart of FIG. 5, a main process that the control circuit 120 executes will be described.

In S10, the control circuit 120 measures a time elapsed in the present processing cycle.

In S20, the control circuit 120 determines whether the time elapsed in the present processing cycle has reached a specific control cycle. The control cycle is preset in advance. The control circuit 120, when determining that the elapsed time has not reached the control cycle (S20: NO), returns to S10. The control circuit 120, when determining that the elapsed time has reached the control cycle (S20: YES), proceeds to S30.

In S30, the control circuit 120 executes a switch information acquisition process to acquire various types of switch signals. The switch information acquisition process will be described later in detail.

In S40, the control circuit 120 executes a power control process to set the power control signal to ON or OFF. The power control process will be described later in detail.

In S50, the control circuit 120 executes a battery information acquisition process to acquire information of the first to fourth battery packs 70A to 70D. The battery information acquisition process will be described later in detail.

In S60, the control circuit 120 executes an error determination process to determine whether the motor 400 is in a state to be stopped or decelerated. The error determination process will be described later in detail.

In S70, the control circuit 120 executes a control mode setting process to set a control mode of the motor 400. The control mode setting process will be described later in detail.

In S80, the control circuit 120 executes a control process of the electromagnetic brake 410 to turn ON or OFF the electromagnetic brake 410. The control process of the electromagnetic brake 410 will be described later in detail.

In S90, the control circuit 120 executes a control process of the motor 400 to drive or stop the motor 400. The control process of the motor 400 will be described later in detail.

In S100, the control circuit 120 executes a notification control process. The control circuit 120 notifies the user that the remaining energy is low when the remaining energy of one of the first to fourth battery packs 70A to 70D is smaller than a remaining energy threshold. The notification control process will be described later in detail. The control circuit 120, after execution of the notification control process of S100, resets the elapsed time and returns to S10, and then starts the next processing cycle.

<2-1. Switch Information Acquisition Process>

Figure 6:
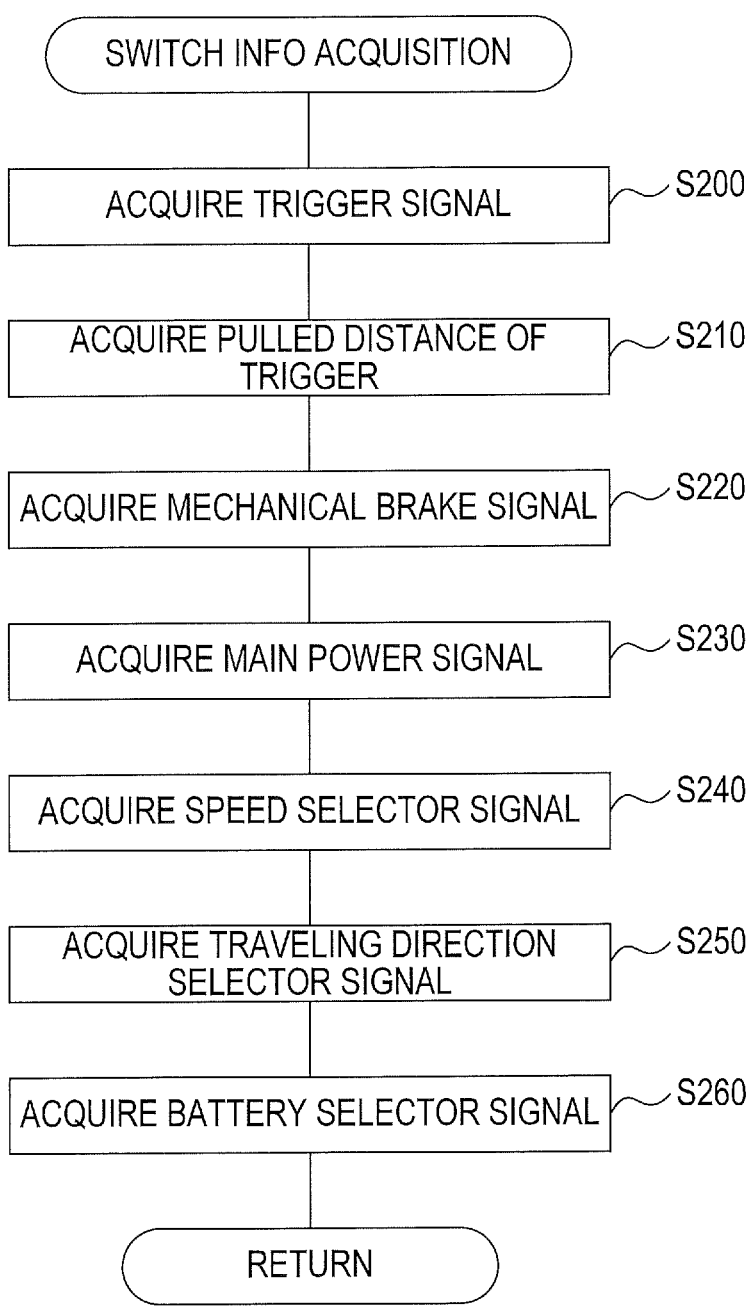
FIG. 6 is a flowchart showing a switch information acquisition process according to the present embodiment.

Referring to a flowchart of FIG. 6, the switch information acquisition process that the control circuit 120 executes in S30 will be described.

In S200, the control circuit 120 acquires a trigger signal output from the trigger switch 98.

In S210, the control circuit 120 acquires a lever signal output from the drive lever 91. The lever signal indicates the pulled distance of the trigger.

In S220, the control circuit 120 acquires the mechanical brake signal output from the mechanical brake switch.

In S230, the control circuit 120 acquires the main power signal output from the main power switch 92.

In S240, the control circuit 120 acquires the speed selector signal output from the speed selector switch 96.

In S250, the control circuit 120 acquires the traveling direction selector signal output from the traveling direction selector switch 94.

In S260, the control circuit 120 acquires the battery selector signal output from the battery selector switch 71. Thereafter, the control circuit 120 proceeds to S40.

<2-2. Power Control Process>

Figure 7:
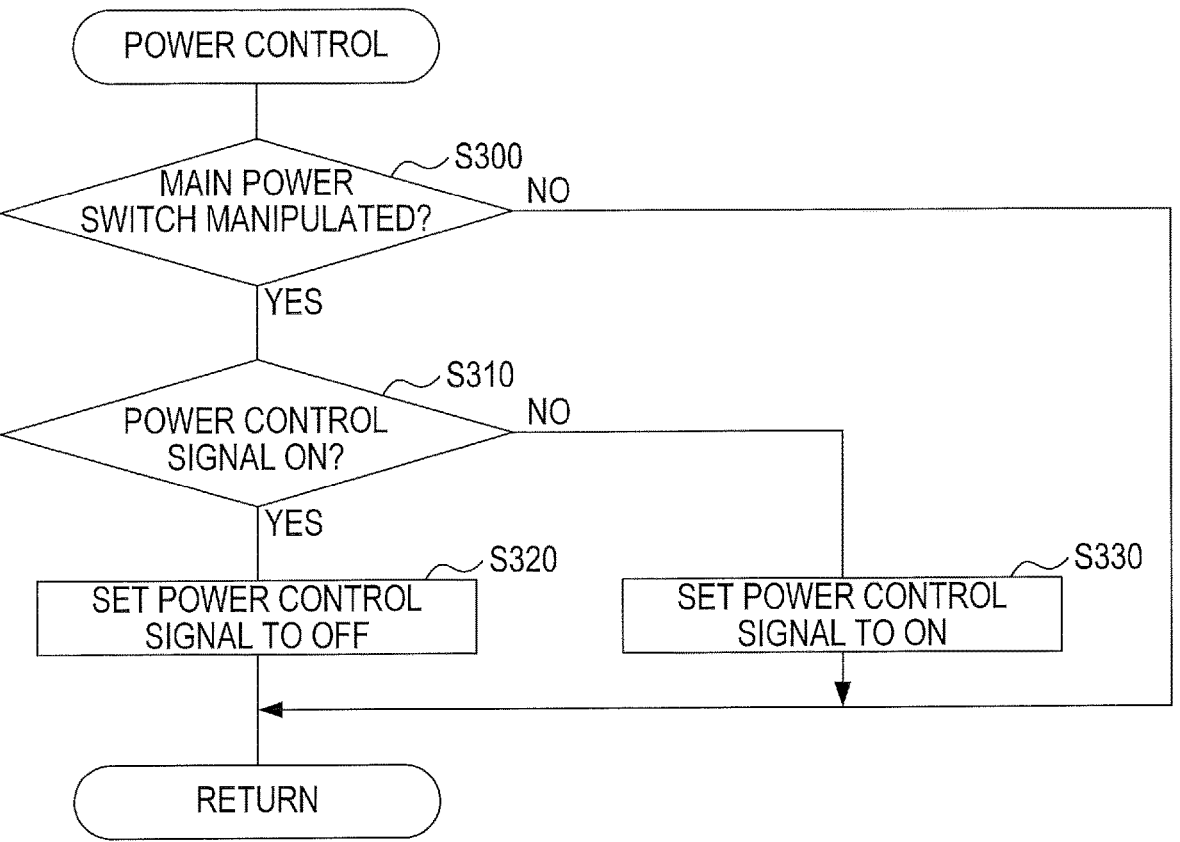
FIG. 7 is a flowchart showing a power control process according to the present embodiment.

Referring to a flowchart of FIG. 7, the power control process that the control circuit 120 executes in S40 will be described.

In S300, the control circuit 120 determines whether the main power switch 92 is manipulated, based on the main power signal acquired in S230. The control circuit 120, when determining that the main power switch 92 is manipulated (S300: YES), proceeds to S310. The control circuit 120, when determining that the main power switch 92 is not manipulated (S300: NO), ends the present process.

In S310, the control circuit 120 determines whether the present power control signal is set to ON. The control circuit 120, when determining that the power control signal is set to ON (S310: YES), proceeds to S320. The control circuit 120, when determining that the power control signal is set to OFF (S310: NO), proceeds to S330.

In S320, the control circuit 120 sets the power control signal to OFF, and ends the present process.

In S330, the control circuit 120 sets the power control signal to ON, and ends the present process.

<2-3. Battery Information Acquisition Process>

Figure 8:
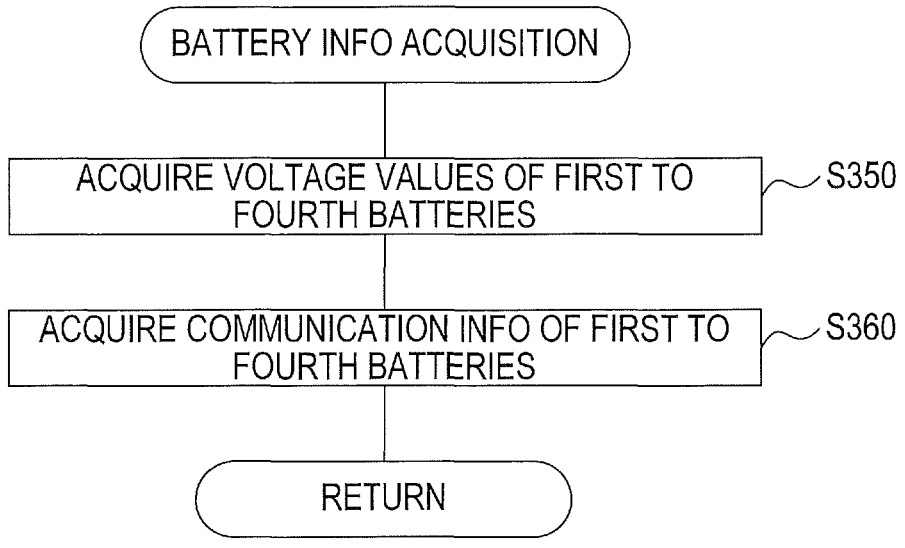
FIG. 8 is a flowchart showing a battery information acquisition process according to the present embodiment.

Referring to a flowchart of FIG. 8, the battery information acquisition process that the control circuit 120 executes in S50 will be described.

In S350, the control circuit 120 acquires detection signals that indicate the voltage values of the first to fourth battery packs 70A to 70D output from the first to fourth voltage detectors 160A to 160D.

In S360, the control circuit 120 acquires information of the first to fourth battery packs 70A to 70D via the battery communicator 190. The information of the first to fourth battery packs 70A to 70D include whether the respective battery packs are permitted or prohibited to discharge. Thereafter, the control circuit 120 ends the present process.

<2-4. Error Determination Process>

Figure 9:
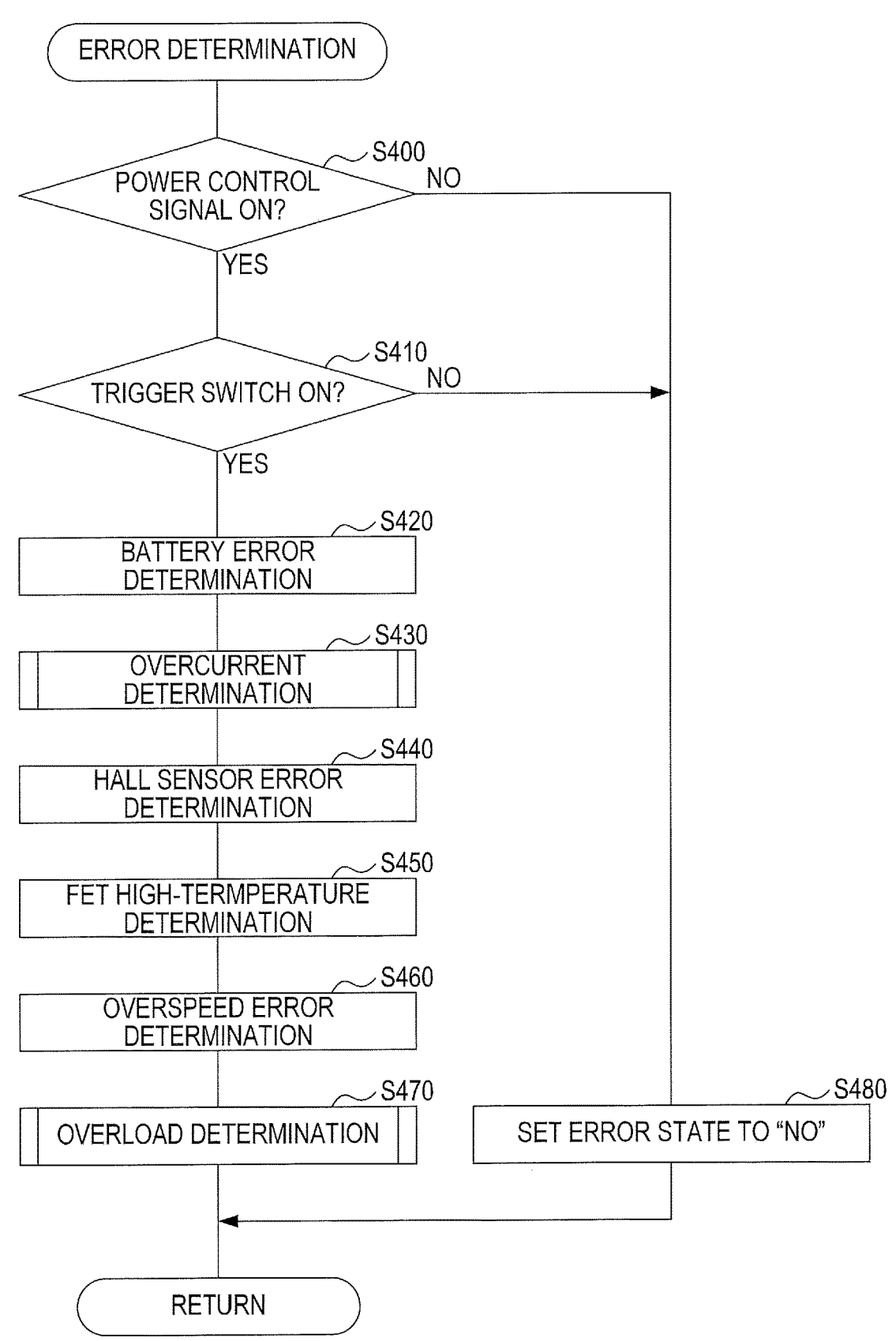
FIG. 9 is a flowchart showing an error determination process according to the present embodiment.

Referring to a flowchart of FIG. 9, the error determination process that the control circuit 120 executes in S60 will be described.

In S400, the control circuit 120 determines whether the power control signal is ON. The control circuit 120, when determining that the power control signal is ON (S400: YES), proceeds to S410. The control circuit 120, when determining that the power control signal is OFF (S400: NO), proceeds to S480.

In S410, the control circuit 120 determines whether the trigger switch 98 is ON. The control circuit 120, when determining that the trigger switch 98 is ON (S410: YES), proceeds to S420. The control circuit 120, when determining that the trigger switch 98 is OFF (S410: NO), proceeds to S480.

In S420, the control circuit 120 executes a battery error determination process. Specifically, the control circuit 120 sets an error state to "YES" if information indicating discharge prohibition or a discharge prohibition signal is acquired from the selected battery packs. The selected battery packs are the two battery packs included in the selected one of the first and second battery sets.

In S430, the control circuit 120 executes an overcurrent determination process, and sets the error state to "YES" if an overcurrent (or a transient current) is flowing through the motor 400. The overcurrent determination process will be described later in detail.

In S440, the control circuit 120 executes a Hall sensor error determination process. Specifically, the control circuit 120 determines whether any of the Hall sensors is faulty based on a Hall sensor signal. The Hall sensor signal is output from each of the three Hall sensors included in the position detection sensor 250. The control circuit 120, when determining that one of the Hall sensors is faulty, sets the error state to "YES".

In S450, the control circuit 120 executes a FET high-temperature determination process. Specifically, the control circuit 120 sets the error state to "YES" when the temperature acquired from the FET temperature detector 180 is greater than or equal to a temperature threshold. The temperature threshold is a value based on an upper limit temperature at which the FET can properly operate.

In S460, the control circuit 120 executes an overspeed error determination process. Specifically, the control circuit 120 sets the error state to "YES" when the rotational frequency of the motor 400 calculated based on the position signal is greater than or equal to a speed threshold.

In S470, the control circuit 120 executes an overload determination process. The control circuit 120 sets the error state to "YES" when the motor 400 is overloaded. The overload determination process will be described later in detail. Thereafter, the control circuit 120 ends the present process.

On the other hand, in S480, the control circuit 120 sets the error state to

"NO", and ends the present process.

<2-4-1. Overcurrent Determination Process>

Figure 10:
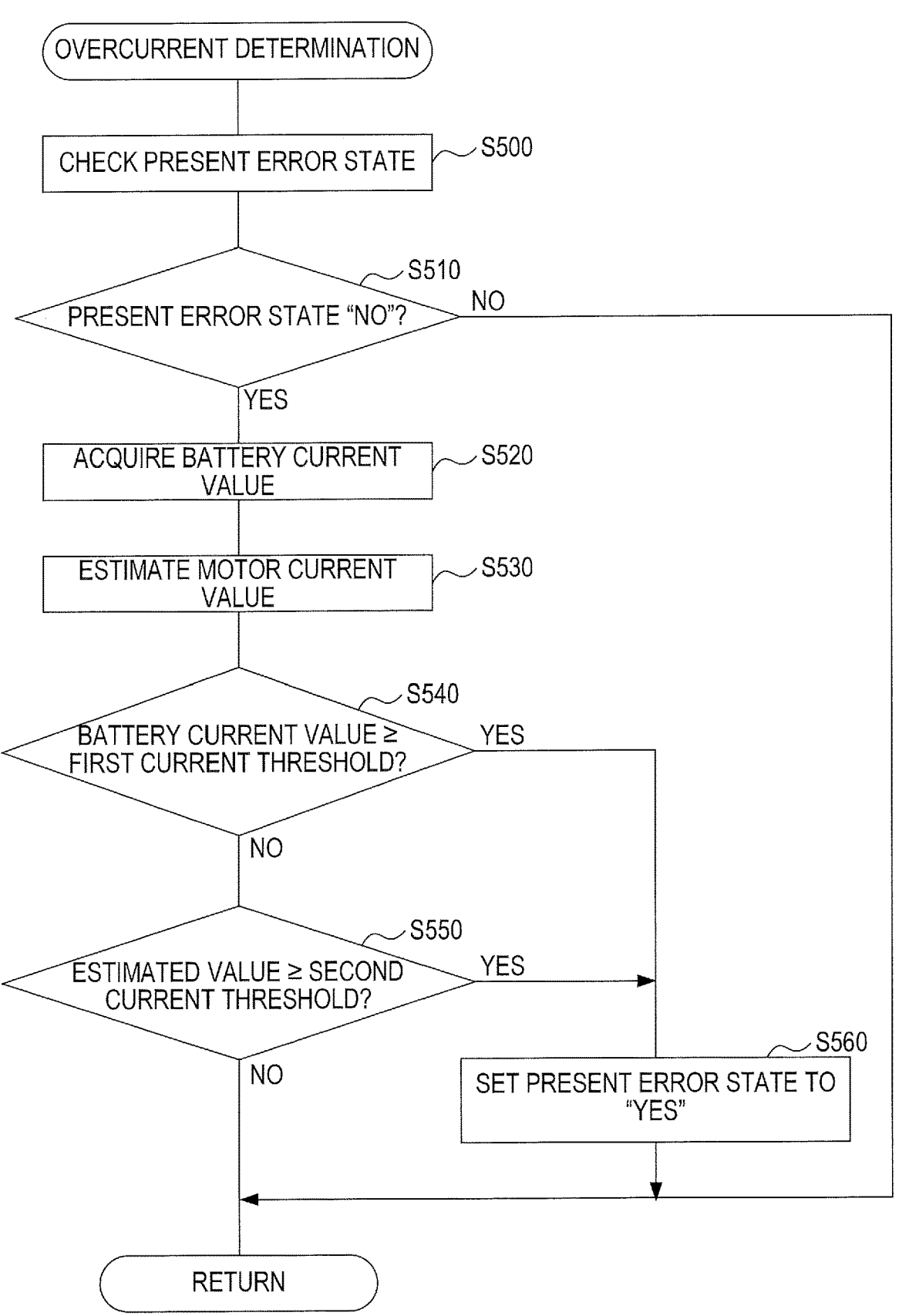
FIG. 10 is a flowchart showing an overcurrent determination process according to the present embodiment.

Referring to a flowchart of FIG. 10, the overcurrent determination process that the control circuit 120 executes in S430 will be described.

In S500, the control circuit 120 checks the present error state.

In S510, the control circuit 120 determines whether the present error state is "NO". The control circuit 120, when determining that the present error state is "NO" (S510: YES), proceeds to S520. The control circuit 120, when determining that the present error state is "YES" (S510: NO), ends the present process.

In S520, the control circuit 120 acquires a battery current value Ib based on the detection signal acquired from the current detection circuit 240. The battery current value Ib corresponds to a magnitude of the electric current flowing through the positive electrode line.

In S530, the control circuit 120 calculates an estimated value Im. The estimated value Im corresponds to a magnitude of the electric current flowing through the motor 400. Specifically, the control circuit 120 calculates the estimated value Im (A) by dividing the battery current value Ib (A) acquired in S510 by a duty ratio Du (%) of the PWM signal. That is, the control circuit 120 calculates the estimated value Im based on a formula $Im=(Ib/Du)\times100$.

In S540, the control circuit 120 determines whether the battery current value Ib is greater than or equal to a first current threshold. The control circuit 120, if determining that the battery current value Ib is greater than or equal to the first current threshold (S540: YES), proceeds to S560. The control circuit 120, when determining that the battery current value Ib is smaller than the first current threshold (S540: NO), proceeds to S550.

In S550, the control circuit 120 determines whether the estimated value Im is greater than or equal to a second current threshold. The control circuit 120, when determining that the estimated value Im is greater than or equal to the second current threshold (S550: YES), proceeds to S560.

The control circuit 120, when determining that the estimated value Im is smaller than the second current threshold (S550: NO), ends the present process.

The first current threshold corresponds to the battery current value at which power supply from the battery pack to the motor 400 should be immediately stopped. The second current threshold may be the same as the first current threshold, or may be greater than the first current threshold. The first current threshold and the second current threshold are preset in advance and stored in the memory 120b.

In S560, the control circuit 120 sets the error state to "YES", and ends the present process.

In the present embodiment, the battery current value Ib and the estimated value Im correspond to an example of a second value based on a value of discharge current flowing from the battery pack through the motor 400.

<2-4-2. Overload Determination Process>

Referring to a flowchart of FIG. 11, the overload determination process that the control circuit 120 executes in S470 will be described.

Figure 24:
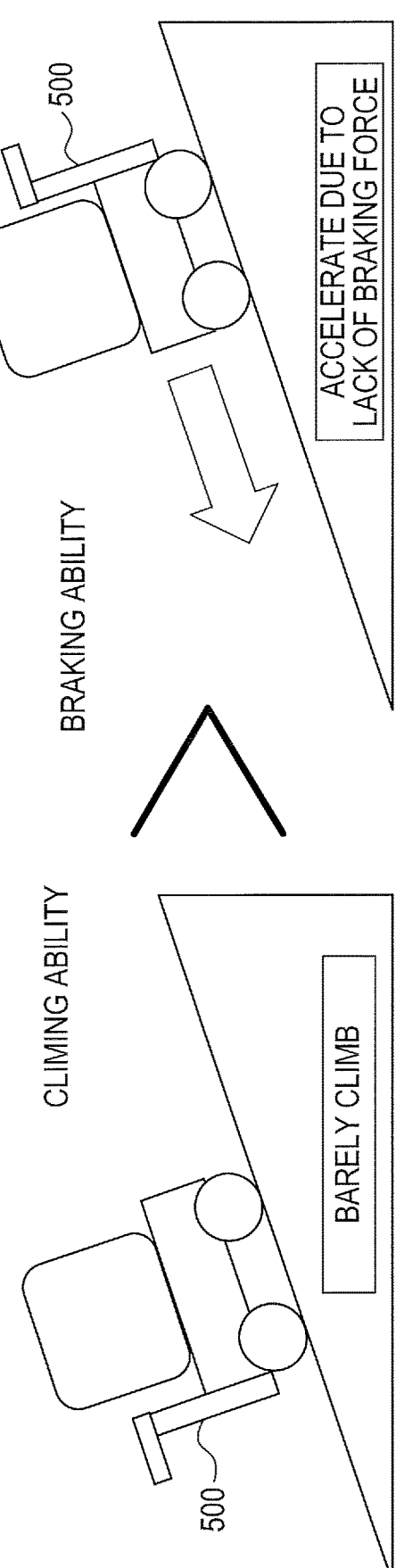
FIG. 24 is an explanatory view of climbing and descending a slope of the battery-powered dolly according to a reference example.

FIG. 24 shows a battery-powered dolly 500 according to a reference example. FIG. 24 shows a state in which the battery-powered dolly 500 climbs a slope having a specific inclination at a specific load weight. As shown in FIG. 24, when a motor torque of the battery-powered dolly 500 is greater than braking forces of the mechanical brake and an electric brake of the battery-powered dolly 500, the battery-powered dolly 500 can climb the aforementioned slope. If the battery-powered dolly 500 is designed to barely climb the slope, the following problem occurs.

Specifically, when the battery-powered dolly 500 descends the aforementioned slope at an upper limit load weight, the rotational frequency of the motor of the battery-powered dolly 500 may increase due to the insufficient braking force. The upper limit load weight is an upper limit value of load at which the battery-powered dolly 500 can climb the aforementioned slope. Thus, when the battery-powered dolly 500 descends the aforementioned slope, the control circuit of the battery-powered dolly 500 performs a control so as not to increase the rotational frequency of the motor. Specifically, when the battery-powered dolly 500 climbs the slope with overloaded weight, the control circuit of the battery-powered dolly 500 stops the motor for protection of the user, and restricts the battery-powered dolly 500 from climbing the slope. When the battery-powered dolly 500 climbs the slope with overloaded weight, the motor is overloaded. Therefore, the control circuit of the battery-powered dolly 500 determines whether the motor is overloaded, and, when the motor is overloaded, stops the motor.

Figure 25:
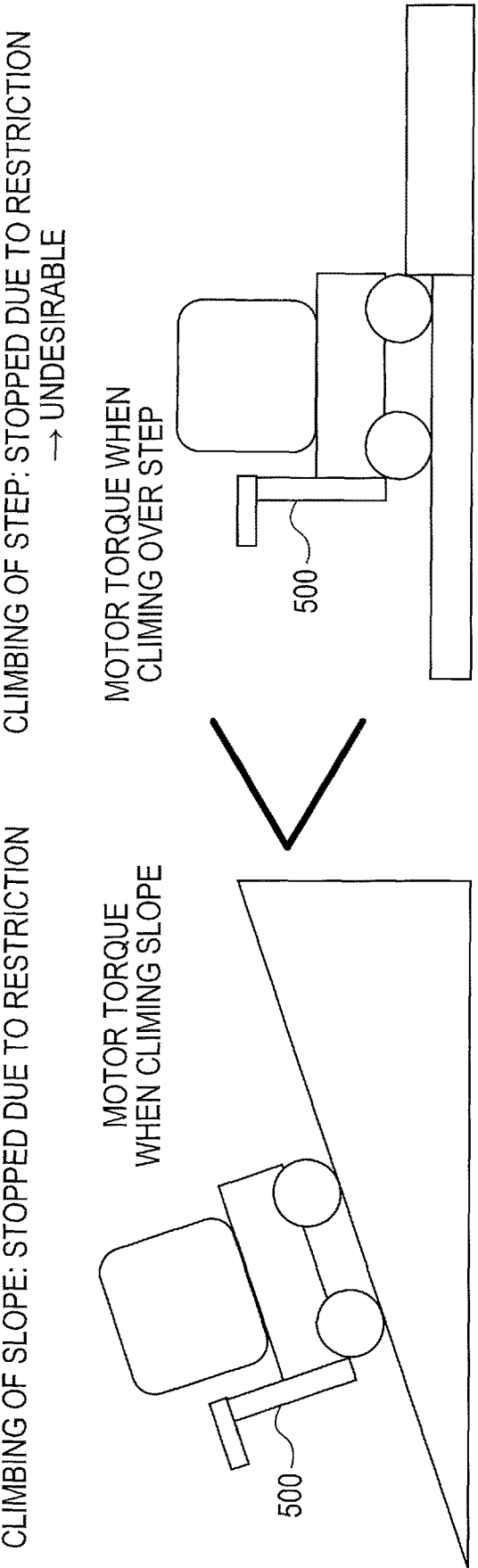
FIG. 25 is an explanatory view of climbing a slope and climbing over a step of the battery-powered dolly according to the reference example.

However, as shown in FIG. 25, there are cases in which a motor torque for the battery-powered dolly 500 to climb over a step having a specific height is greater than the motor torque for the battery-powered dolly 500 to climb the slope. In other words, when the battery-powered dolly 500 climbs over the step, the motor may momentarily receive a greater load than the load received during climbing the slope. Thus, when the control circuit of the battery-powered dolly 500 stops the motor in response to the motor momentarily being overloaded, the battery-powered dolly 500 cannot climb over the step. In addition, tasks with the battery-powered dolly 500 may be interfered.

Therefore, the control circuit 120 of the battery-powered dolly 1 according to the present embodiment, when the motor 400 is continuously overloaded, stops the motor 400 to protect the user. When the battery-powered dolly 1 climbs the slope, the front wheel 3 rotates once (that is, 360 degrees) or more. On the other hand, when the battery-powered dolly 1 climbs over the step, the front wheel 3 does not rotate once. Thus, the control circuit 120 determines whether the motor 400 is continuously overloaded based on a rotation information of the front wheel 3. Specifically, the control circuit 120 stops the motor 400 when the motor 400 is continuously overloaded while the front wheel 3 rotates once.

In S600 to S630, the control circuit 120 executes the same processing as those in S500 to S530.

In S640, the control circuit 120 calculates a first mean value Ad. The first mean value Ad is a mean value of the battery current values Ib acquired during a specified period. For example, the control circuit 120 calculates the first mean value Ad by taking a moving-average of the battery current values Ib every 3 seconds.

In S650, the control circuit 120 calculates a second mean value Am.

The second mean value Am is a mean value of the estimated values Im calculated during the specified period. For example, the control circuit 120 calculates the second mean value Am by taking a moving-average of the estimated values Im every 3 seconds.

In S660, the control circuit 120 acquires the rotation information of the motor 400. In the present embodiment, the rotation information includes the number of updates of the position signal. The number of updates of the position signal corresponds to a rotation angle of the rotor of the motor 400.

In S670, the control circuit 120 determines whether the first mean value Ad is greater than or equal to a third current threshold. The control circuit 120, when determining that the first mean value Ad is greater than or equal to the third current threshold (S670: YES), proceeds to S690. The control circuit 120, when determining that the first mean value Ad is smaller than the third current threshold (S670: NO), proceeds to S680. The third current threshold corresponds to the battery current value when it is not necessary to immediately stop the motor 400 although the motor 400 is overloaded. Accordingly, the third current threshold is smaller than the first current threshold used for overcurrent determination.

In S680, the control circuit 120 determines whether the second mean value Am is greater than or equal to a fourth current threshold. The control circuit 120, when determining that the second mean value Am is greater than or equal to the fourth current threshold (S680: YES), proceeds to S690. The control circuit 120, when determining that the second mean value Am is smaller than the fourth current threshold (S680: NO), proceeds to S700. The fourth current threshold may be the same value as the third current threshold, or may be greater than the third current threshold. The third current threshold and the fourth current threshold are preset in advance and stored in the memory 120*b*.

In S690, the control circuit 120 determines whether the number of updates indicated by the rotation information of the motor 400 is greater than or equal to a first rotation threshold. The first rotation threshold is the number of updates of the position signal corresponding to a specific rotational frequency of the rotor. The specific rotational frequency of the rotor corresponds to one turn (that is, 360 degrees) of the front wheel 3. A ratio of a rotational frequency of the front wheel 3 to the rotational frequency of the rotor is determined in accordance with a gear ratio of the gear 420. The control circuit 120, when determining that the number of updates indicated by the rotation information is greater than or equal to the first rotation threshold (S690:

YES), proceeds to S710. The control circuit 12, when determining that the number of updates indicated by the rotation information is smaller than the first rotation threshold (S690: NO), ends the present process.

In S700, the control circuit 120 resets the rotation information of the motor. As a result, the number of updates of the position signal returns to zero (0). Thereafter, the control circuit 120 ends the present process.

In S710, the control circuit 120 sets the present error state to "YES", and ends the present process.

In the present embodiment, the first mean value Ad and the second mean value Am correspond to an example of a first value based on the value of discharge current flowing from the battery pack to the motor 400.

<2-5. Control Mode Setting Process>

Figure 12A:
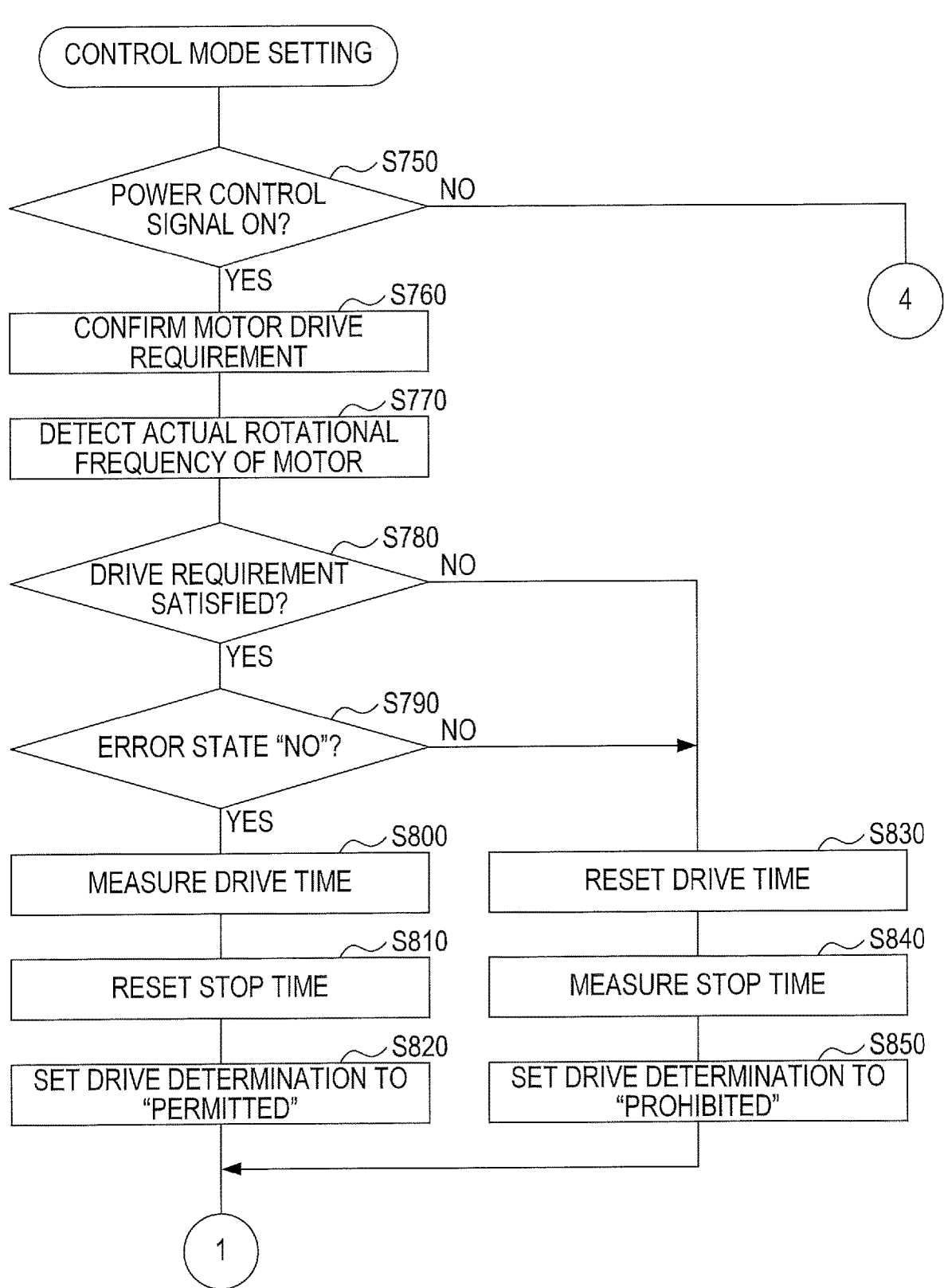
FIG. 12A is a flowchart showing a part of a control mode setting process according to the present embodiment.
Figure 12B:
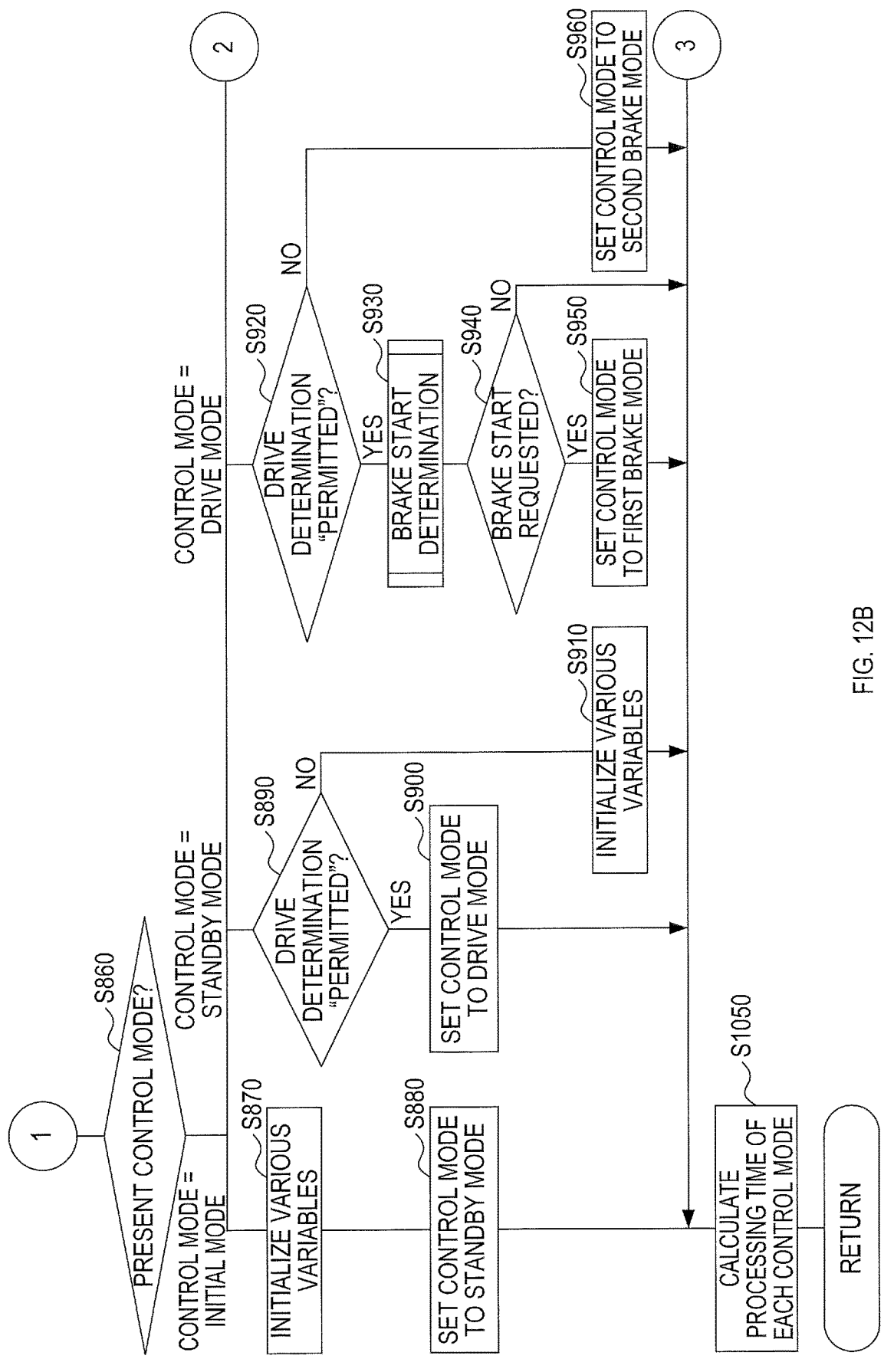
FIG. 12B is a flowchart showing another part of the control mode setting process according to the present embodiment.
Figure 12C:
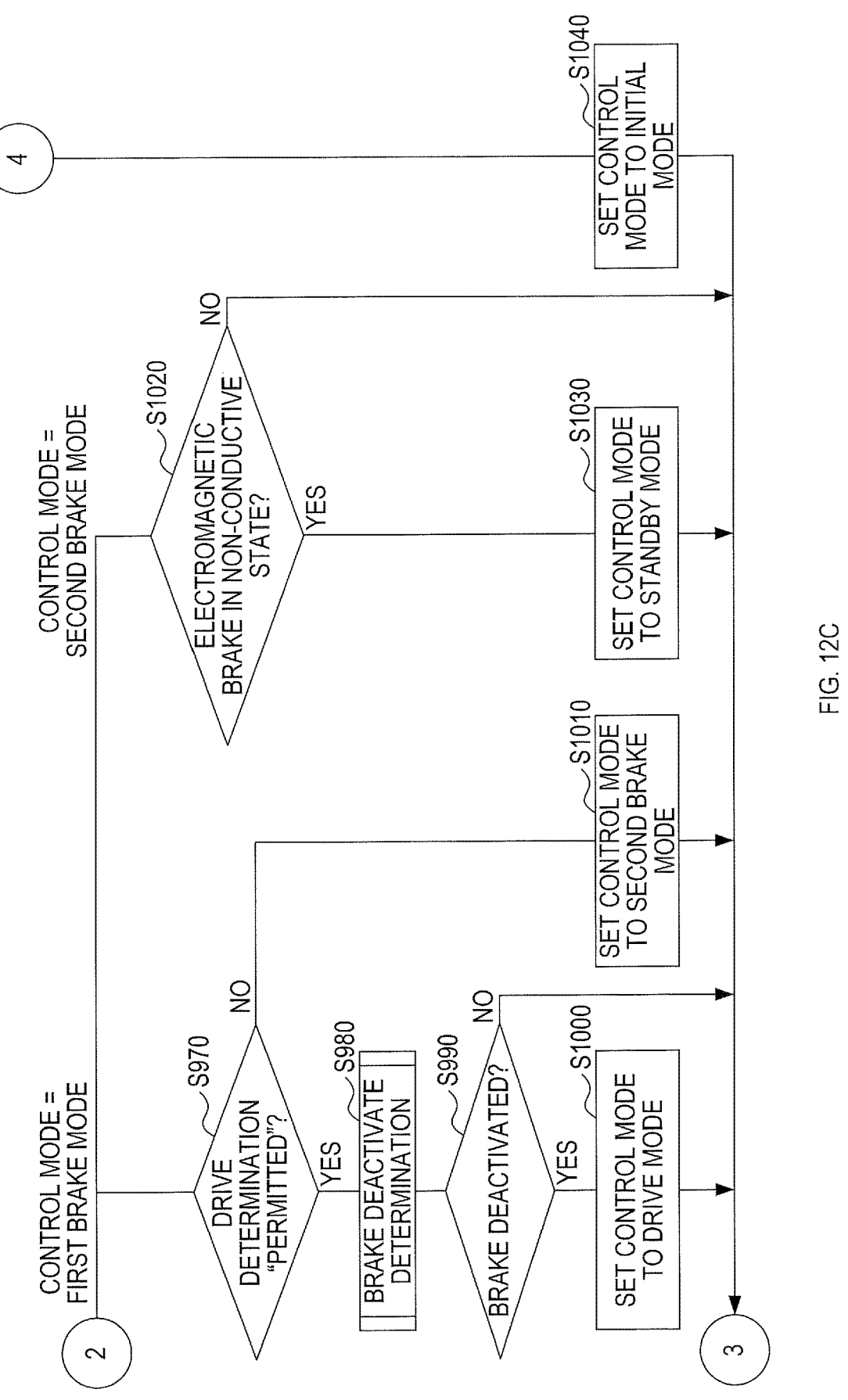
FIG. 12C is a flowchart showing the remaining part of the control mode setting process according to the present embodiment.

Referring to FIGS. 12A to 12C, the control mode setting process that the control circuit 120 executes in S70 will be described.

In S750, the control circuit 120 determines whether the power control signal is ON. The control circuit 120, when determining that the power control signal is ON (S750: YES), proceeds to S760. The control circuit 120, when determining that the power control signal is OFF (S750: NO), proceeds to S1040.

In S760, the control circuit 120 confirms the drive requirement of the motor 400. In the present embodiment, the drive requirement is that the trigger switch 98 is ON and the mechanical brake switch is OFF. Accordingly, in S760, the control circuit 120 checks whether the trigger signal and the mechanical brake signal are ON or OFF.

In S770, the control circuit 120 detects an actual rotational frequency of the motor 400 based on the position signal acquired from the position detection sensor 250.

In S780, the control circuit 120 determines whether the drive requirement of the motor 400 is satisfied. The control circuit 120, when determining that the drive requirement is satisfied (S780: YES), proceeds to S790. The control circuit 120, when determining that the drive requirement is not satisfied (S780: NO), proceeds to S830.

In S790, the control circuit 120 determines whether the error state is "NO". The control circuit 120 confirms the error state so that the motor 400 is not driven when the error state is "YES". The control circuit 120, when determining that the error state is "NO" (S790: YES), proceeds to S800. The control circuit 120, when determining that the error state is "YES" (S790: NO), proceeds to S830.

In S800, the control circuit 120 measures a driving time of the motor 400

In S810, the control circuit 120 resets a stop time of the motor 400. In S820, the control circuit 120 sets a drive determination of the motor 400 to "permitted". When the motor 400 can be driven, the drive determination is set to "permitted", and, when the motor 400 cannot be driven, the drive determination is set to "prohibited".

On the other hand, in S830, the control circuit 120 resets the driving time of the motor 400.

In S840, the control circuit 120 measures the stop time of the motor 400.

In S850, the control circuit 120 sets the drive determination of the motor 400 to "prohibited".

In S860, the control circuit 120 confirms the present control mode of the motor 400. The control circuit 120, when determining that the control mode is an initial mode, proceeds to S870. The control circuit 120, when determining that the control mode is a standby mode, proceeds to S890. The control circuit 120, when determining that the control mode is a drive mode, proceeds to S920. The control circuit

120, when determining that the control mode is a first brake mode, proceeds to S970. The control circuit 120, when determining that the control mode is a second brake mode, proceeds to S1020.

In S870, the control circuit 120 initializes various types of variables.

In S880, the control circuit 120 sets the control mode to the standby mode, and proceeds to S1050.

In S890, the control circuit 120 determines whether the drive determination is "permitted". The control circuit 120, when determining that the drive determination is "permitted" (S890: YES), proceeds to S900. The control circuit 120, when determining that the drive determination is "prohibited" (S890: NO), proceeds to S910.

In S900, the control circuit 120 sets the control mode to the drive mode, and proceeds to S1050.

In S910, the control circuit 120 initializes various types of variables, and proceeds to S1050.

In S920, the control circuit 120 determines whether the drive determination is "permitted". The control circuit 120, when determining that the drive determination is "permitted" (S920: YES), proceeds to S930. The control circuit 120, when determining that the drive determination is "prohibited" (S920: NO), proceeds to S960.

In S930, the control circuit 120 executes a brake start determination process, and determines whether a brake start is requested. When the rotational frequency of the motor 400 is excessively high, the control circuit 120 causes the braking force to be generated for safety, even if the drive determination is "permitted". The brake start determination process will be described later in detail.

In S940, the control circuit 120 determines whether the brake start is requested. The control circuit 120, when determining that the brake start is requested (S940: YES), proceeds to S950. The control circuit 120, when determining that the brake start is not requested (940: NO), proceeds to S1050.

In S950, the control circuit 120 changes the control mode to the first brake mode. Specifically, when the brake start is requested, the control circuit 120 changes the control mode from the drive mode to the first brake mode, even if the drive determination is "permitted". Thereafter, the control circuit 120 proceeds to S1050.

In S960, the control circuit 120 sets the control mode to the second brake mode. Specifically, the control circuit 120 changes the control mode from the drive mode to the second brake mode when the drive determination changes to "prohibited" in the drive mode. Thereafter, the control circuit 120 proceeds to S1050. The control circuit 120, in the first brake mode, activates the electric brake (specifically, two-phase short-circuit brake) by the motor 400, but brings the electromagnetic brake 410 into the conductive state and does not activate the electromagnetic brake 410. The control circuit 120, in the second brake mode, activates the electric brake by the motor, brings the electromagnetic brake 410 into the non-conductive state, and activates the electromagnetic brake 410.

In S970, the control circuit 120 determines whether the drive determination is "permitted". The control circuit 120, when determining that the drive determination is "permitted" (S970: YES), proceeds to S980. The control circuit 120, when determining that the drive determination is "prohibited" (S970: NO), proceeds to S1010.

In S980, the control circuit 120 executes a brake deactivate determination process. The control circuit 120 deactivates the electric brake when it is possible to deactivate the electric brake by the motor 400. The brake deactivate determination process will be described later in detail.

In S990, the control circuit 120 determines whether the electric brake is deactivated. The control circuit 120, when determining that the electric brake is deactivated (S990: YES), proceeds to S1000. The control circuit 120, when determining that the electric brake is not deactivated (S990: NO), proceeds to S1050.

In S1000, the control circuit 120 sets the control mode to the drive mode. Specifically, the control circuit 120 returns the control mode to the drive mode when the electric brake is deactivated in the first brake mode.

In S1010, the control circuit 120 sets the control mode to the second brake mode. Specifically, the control circuit 120, when the drive determination changes to "prohibited" in the first brake mode, changes the control mode to the second brake mode and stops the motor 400.

In S1020, the control circuit 120 determines whether the electromagnetic brake 410 is in the non-conductive state. The control circuit 120, when determining that the electromagnetic brake 410 is in the non-conductive state, confirms that the motor 400 is in a stopped state. The control circuit 120, when determining that the electromagnetic brake 410 is in the non-conductive state (S1020: YES), proceeds to S1030. The control circuit 120, when determining that the electromagnetic brake 410 is in the conductive state (S1020: NO), proceeds to S1050.

In S1030, the control circuit 120 sets the control mode to the standby mode.

In S1040, the control circuit 120 sets the control mode to the initial mode.

In S1050, the control circuit 120 calculates a processing time of each control mode. The processing time is used at a starting point when saving a driving state and a starting point in a branch condition, and detail thereof is omitted.

<2-5-1. First Example of Brake Start Determination Process>

Figure 13:
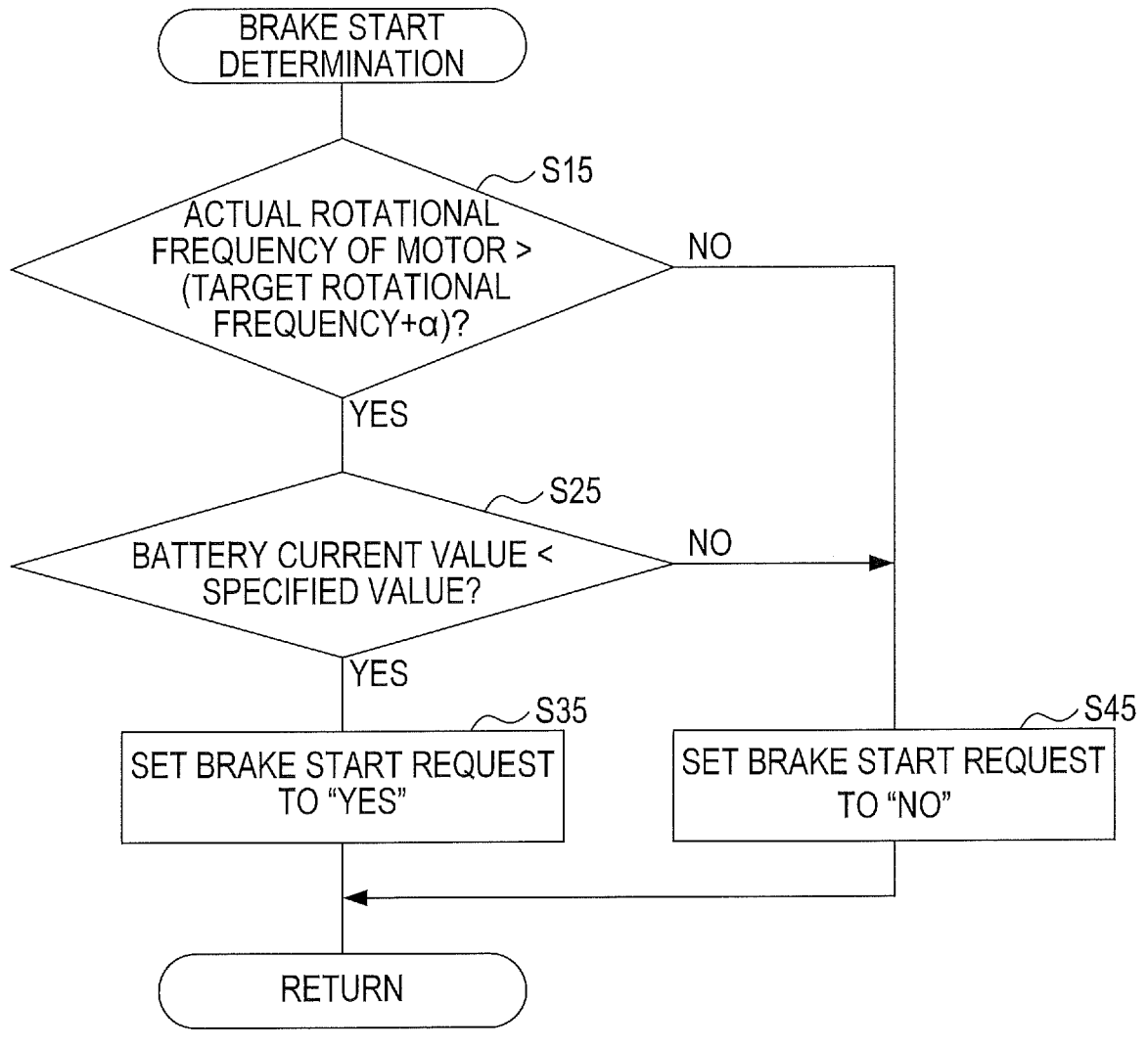
FIG. 13 is a flowchart showing a first example of a brake start determination process according to the present embodiment.

Referring to a flowchart of FIG. 13, a first example of the brake start determination process that the control circuit 120 executes in S930 will be described.

In S15, the control circuit 120 determines whether the actual rotational frequency of the motor 400 is greater than the set target rotational frequency. Specifically, the control circuit 120 determines whether the actual rotational frequency is greater than the target rotational frequency $+\alpha$. The $\alpha$ is a positive value. A process of setting the target rotational frequency will be described later. The control circuit 120, when determining that the actual rotational frequency is greater than the target rotational frequency $+\alpha$ (S15: YES), proceeds to S25. The control circuit 120, when determining that the actual rotational frequency is smaller than or equal to the target rotational frequency $+\alpha$ (S15: NO), proceeds to S45.

In S25, the control circuit 120 determines whether the battery current value Id is smaller than a specified value. The control circuit 120, when determining that the battery current value Id is smaller than the specified value (S25: YES), proceeds to S35. The control circuit 120, when determining that the battery current value Id is greater than or equal to the specified value (S25: NO), proceeds to S45.

In S35, the control circuit 120 confirms that the battery-powered dolly 1 moved from a flat ground to a downslope based on (i) the actual rotational frequency being greater than the target rotational frequency and (ii) the battery current value Id being smaller than the specified value. In this case, the actual rotational frequency may continue to increase. Thus, the control circuit 120 sets the brake start request to "YES", and ends the present process.

In S45, the control circuit 120 sets the brake start request to "NO", and ends the present process.

<2-5-2. Second Example of Brake Start Determination Process>

Figure 14:
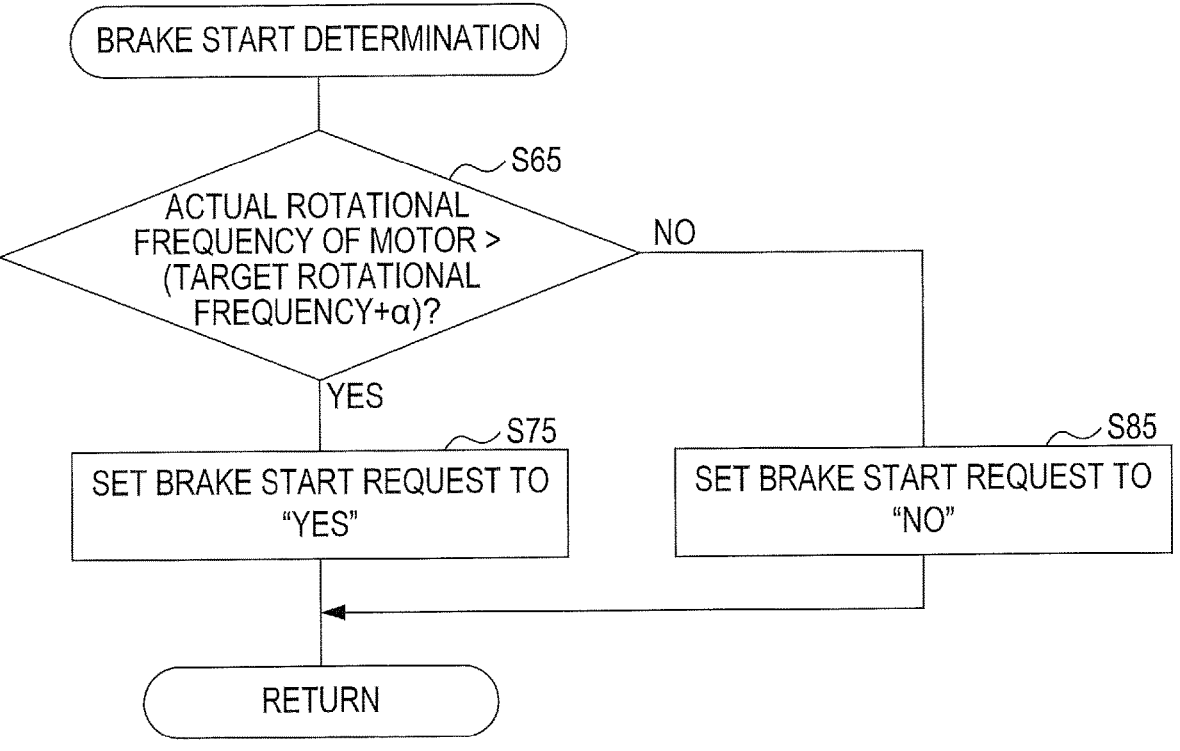
FIG. 14 is a second example of the brake start determination process according to the present embodiment.

Referring to a flowchart of FIG. 14, a second example of the brake start determination process that the control circuit 120 executes in S930 will be described.

In S65, the control circuit 120 executes the same processing as that in S15.

In S75, the control circuit 120 executes the same processing as that in S35, and in S85, executes the same processing as that in S45.

In the second example, unlike the first example, the requirement for setting the brake start request to "YES" does not include the battery current value Id being smaller than the specified value. In other words, the control circuit 120, in the second example, confirms that the battery-powered dolly 1 moved from a flat ground to downslope, regardless of the magnitude of the battery current value Id, when the actual rotational frequency is greater than the target rotational frequency.

<2-5-3. Brake Deactivate Determination Process>

Figure 15:
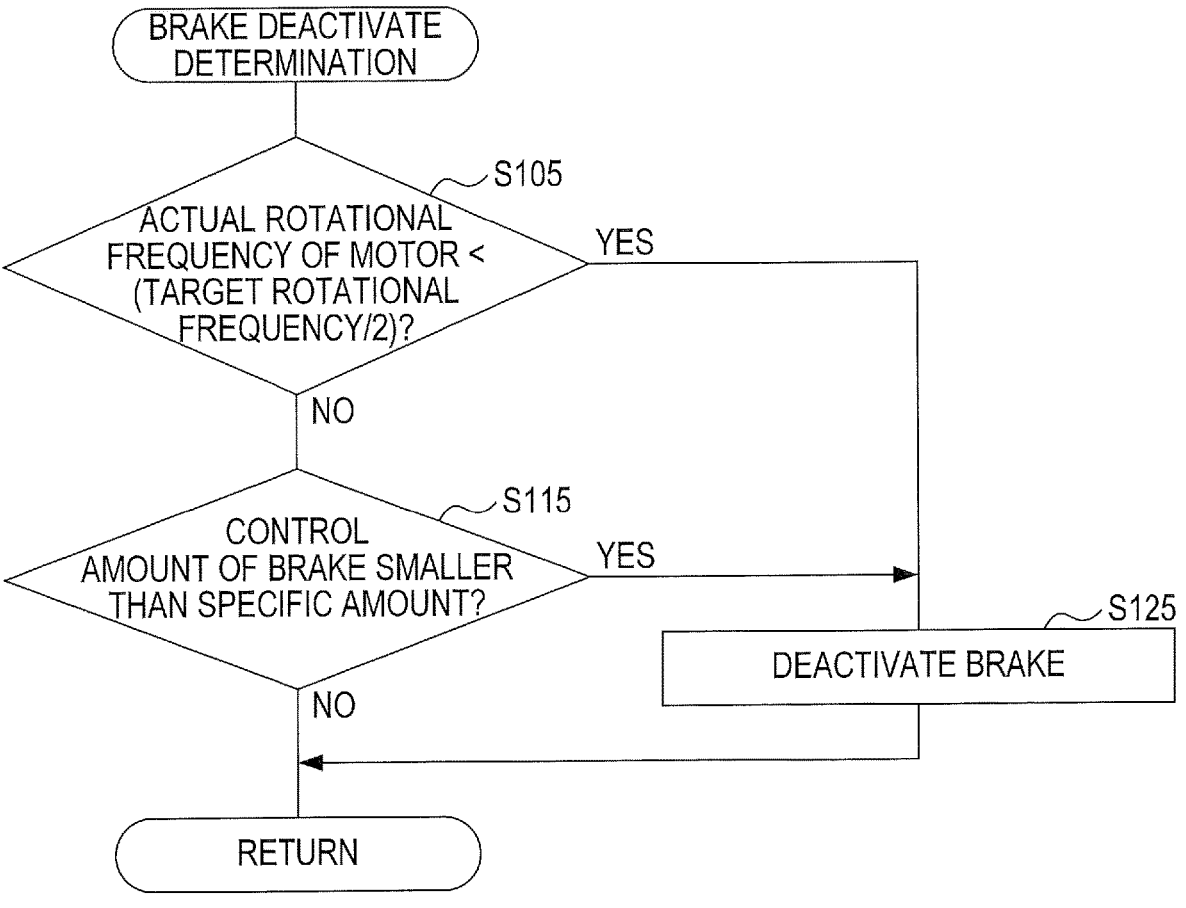
FIG. 15 is a flowchart showing a brake deactivate determination process according to the present embodiment.

Referring to a flowchart of FIG. 15, the brake deactivate determination process that the control circuit 120 executes in S980 will be described.

In S105, the control circuit 120 determines whether the actual rotational frequency of the motor 400 is smaller than half of the target rotational frequency. The control circuit 120, when determining that the actual rotational frequency is smaller than half of the target rotational frequency (S105: YES), proceeds to S125. The control circuit 120, when determining that the actual rotational frequency is more than or equal to half of the target rotational frequency (S105: NO), proceeds to S115.

In S115, the control circuit 120 determines whether a control amount of the electric brake is smaller than a specific amount. The control circuit 120, when determining that the control amount of the electric brake is smaller than the specific amount (S115: YES), proceeds to S125. The control circuit 120, when determining that the control amount of the electric brake is greater than or equal to the specific amount, does not deactivate the electric brake and ends the present process.

In S125, the control circuit 120 deactivates the electric brake. Specifically, the control circuit 120 confirms that the battery-powered dolly 1 moved from a downslope to a flat ground based on (i) decrease in actual rotational frequency or (ii) decrease in the control amount of the electric brake, and deactivates the electric brake.

<2-6. Electromagnetic Brake Control Process>

Figure 16:
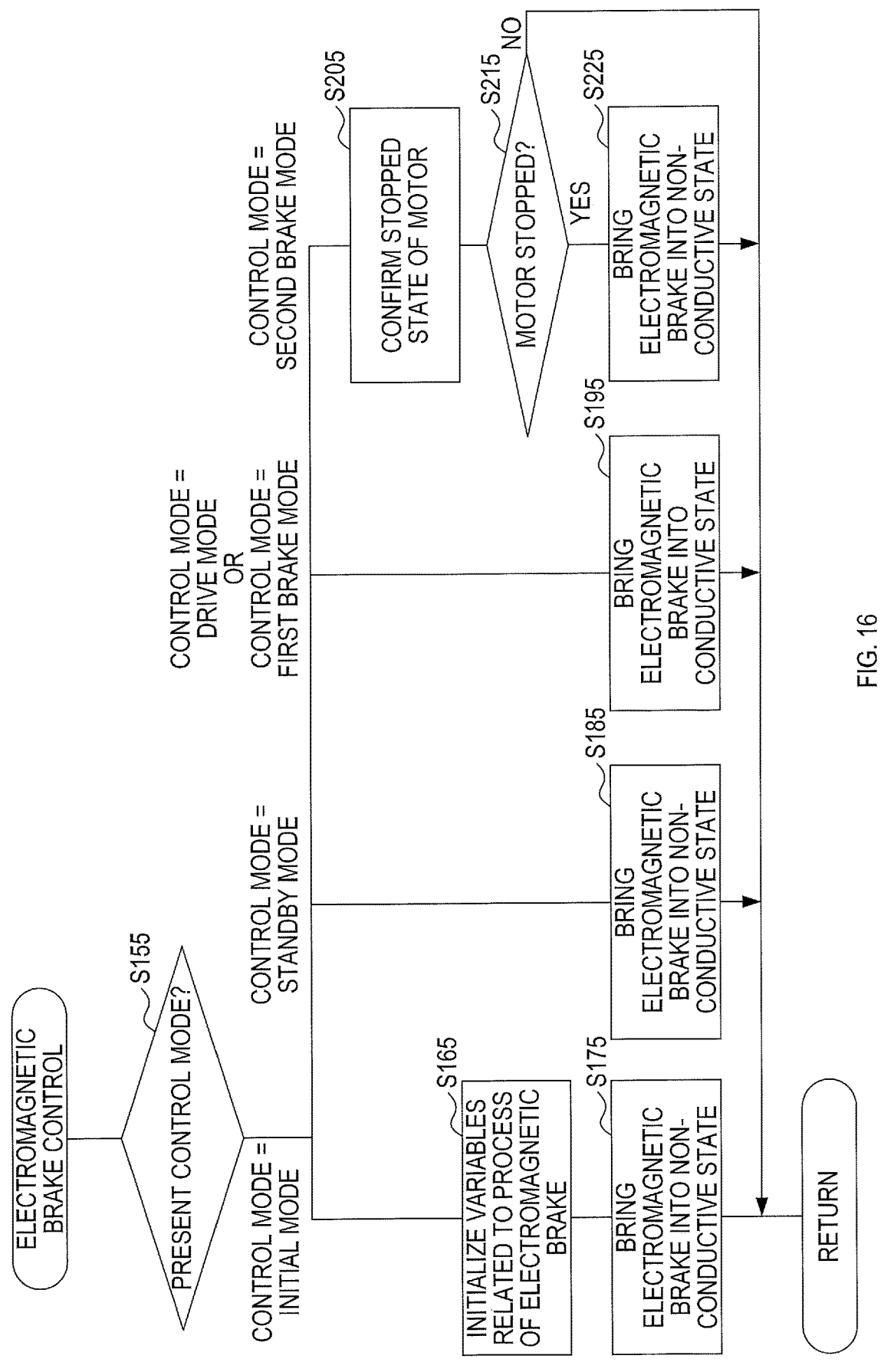
FIG. 16 is a flowchart showing an electromagnetic brake control process according to the present embodiment.

Referring to a flowchart of FIG. 16, the electromagnetic brake control process that the control circuit 120 executes in S80 will be described.

In S155, the control circuit 120 confirms the present control mode. The control circuit 120, when determining that the present control mode is the initial mode, proceeds to S165. The control circuit 120, when determining that the present control mode is the standby mode, proceeds to S185. The control circuit 120, when determining that the present control mode is the drive mode or the first brake mode, proceeds to S195. The control circuit 120, when determining that the present control mode is the second brake mode, proceeds to S205.

In S165, the control circuit 120 initializes variables related to the process of the electromagnetic brake 410.

In S175, the control circuit 120 brings the electromagnetic brake 410 into the non-conductive state. This activates the electromagnetic brake 410, and the braking force by the electromagnetic brake 410 is applied to the motor 400.

In S185, the control circuit 120 executes the same processing as that in S175.

In S195, the control circuit 120 brings the electromagnetic brake 410 into the conductive state. This deactivates the electromagnetic brake 410, and the braking force by the electromagnetic brake 410 is no longer applied to the motor 400. If the braking force by the electromagnetic brake 410 is applied to the motor 400 during driving of the motor 400, the electromagnetic brake 410 may fail. Thus, the control circuit 120 does not activate the electromagnetic brake 410 for safety until the rotational frequency of the motor 400 sufficiently decreases.

In S205, the control circuit 120 confirms a stopped state of the motor 400. Here, the control circuit 120 determines that the motor 400 is in the stopped state when the rotational frequency of the motor 400 is smaller than or equal to a rotation threshold. The rotation threshold is a value small enough to determine that the motor 400 is in the stopped state, for example, 250 rpm.

In S215, the control circuit 120 determines whether motor 400 is in the stopped state. The control circuit 120, when determining that the motor 400 is in the stopped state (S215: YES), proceeds to S225. In S225, the control circuit 120 brings the electromagnetic brake 410 into the non-conductive state based on the motor 400 being in the stopped state, and activates the electromagnetic brake 410.

On the other hand, the control circuit 120, when determining that the motor 400 is not in the stopped state (S215: NO), does not activate the electromagnetic brake 410 and ends the present process. The control circuit 120 does not activate the electromagnetic brake 410 for safety when the motor 400 is not in the stopped state.

<2-7. Motor Control Process>

Figure 17:
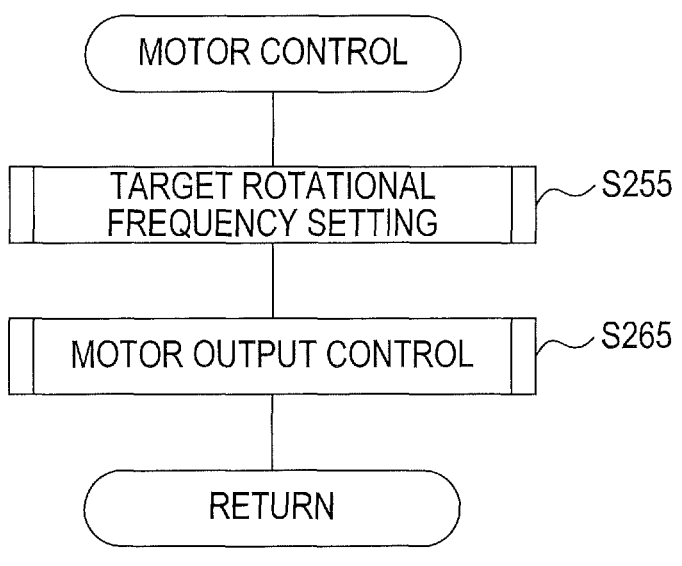
FIG. 17 is a flowchart showing a motor control process according to the present embodiment.

Referring to a flowchart of FIG. 17, the motor control process that the control circuit 120 executes in S90 will be described.

In S255, the control circuit 120 executes the process of setting the target rotational frequency and sets the target rotational frequency of the motor 400 based on the set control mode, traveling direction and speed mode, and the pulled distance of the trigger. The process of setting the target rotational frequency will be described later in detail.

In S265, the control circuit 120 executes a motor output control process, and outputs the control signal to the gate circuit 130. The motor output control process will be described later in detail.

<2-7-1. Process of Setting Target Rotational Frequency>

Figure 18:
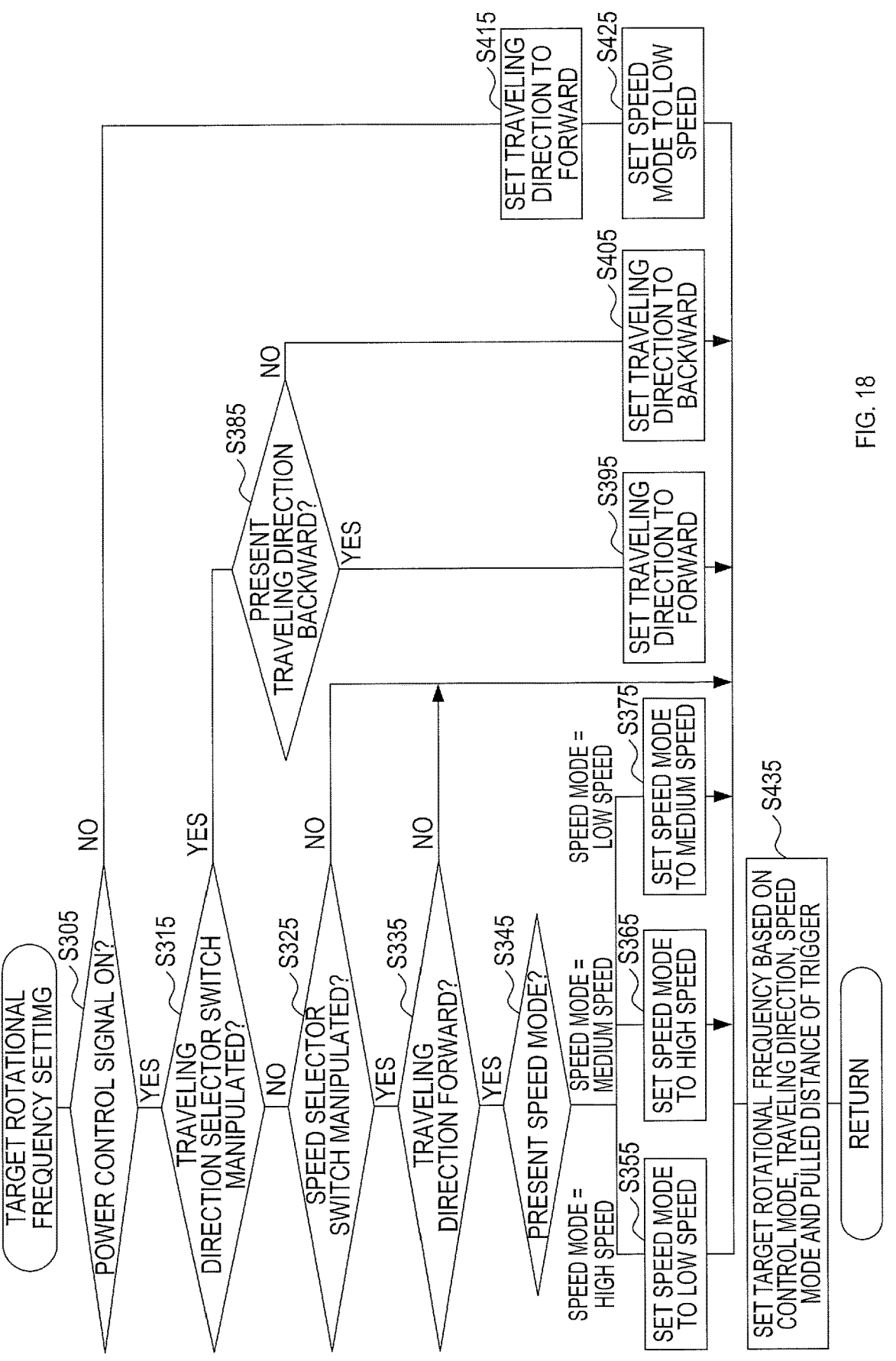
FIG. 18 is a flowchart showing a target rotational frequency setting process according to the present embodiment.

Referring to a flowchart of FIG. 18, the process of setting the target rotational frequency that the control circuit 120 executes in S255 will be described.

In S305, the control circuit 120 determines whether the power control signal is ON. The control circuit 120, when determining that the power control signal is ON (S305: YES), proceeds to S315. The control circuit 120, when determining that the power control signal is OFF (S305: NO), proceeds to S415.

In S315, the control circuit 120 determines whether the traveling direction selector switch 94 is manipulated by the user. The control circuit 120, when determining that the traveling direction selector switch 94 is manipulated by the user (S315: YES), proceeds to S385. The control circuit 120, when determining that the traveling direction selector switch 94 is not manipulated by the user (S315: NO), proceeds to S325.

In S325, the control circuit 120 determines whether the speed selector switch 96 is manipulated by the user. The control circuit 120, when determining that the speed selector switch 96 is manipulated by the user (S325: YES), proceeds to S335. The control circuit 120, when determining that the speed selector switch 96 is not manipulated by the user (S325: NO), does not change the traveling direction and the speed mode, and proceeds to S435.

In S335, the control circuit 120 determines whether the traveling direction presently set is forward. The control circuit 120, when determining that the traveling direction is forward (S335: YES), proceeds to S345. The control circuit 120, when determining that the traveling direction is backward (S335: NO), does not change the traveling direction and the speed mode, and proceeds to S435. The control circuit 120, when the traveling direction is set to forward, changes the speed mode in response to the speed selector switch 96 being manipulated by the user. On the other hand, the control circuit 120, when the traveling direction is set to backward, does not change the speed mode even if the speed selector switch 96 is manipulated by the user.

In S345, the control circuit 120 confirms the presently set speed mode in order to change the speed mode. When the speed mode is set to high-speed, the control circuit 120 proceeds to S355. When the speed mode is set to medium-speed, the control circuit 120 proceeds to S365. When the speed mode is set to low-speed, the control circuit 120 proceeds to S375.

In S355, the control circuit 120 changes the speed mode from high-speed to low-speed, and proceeds to S435.

In S365, control circuit 120 changes the speed mode from medium-speed to high-speed, and proceeds to S435.

In S375, the control circuit 120 changes the speed mode from low-speed to medium-speed, and proceeds to S435.

In S385, the control circuit 120 determines whether the traveling direction presently set is backward. The control circuit 120, when determining that the traveling direction is backward (S385: YES), proceeds to S395. The control circuit 120, when determining that the traveling direction is forward (S385: NO), proceeds to S405.

In S395, the control circuit 120 changes the traveling direction from backward to forward, and proceeds to S435.

In S405, the control circuit 120 changes the traveling direction from forward to backward, and proceeds to S435.

In S415, the control circuit 120 sets the traveling direction to forward as an initial setting.

In S425, the control circuit 120 sets the speed mode to the low-speed mode as the initial setting, and proceeds to S435.

In S435, the control circuit 120 sets the target rotational frequency based on the present control mode, the present traveling direction, the present speed mode, and the pulled distance of the trigger. The control circuit 120, when the control mode is the first brake mode, sets the target rotational frequency smaller than when the control mode is drive mode. The control circuit 120, when the control mode is the second brake mode, gradually brings the target rotational frequency close to zero (0).

<2-7-2. Motor Output Control Process>

Figure 19:
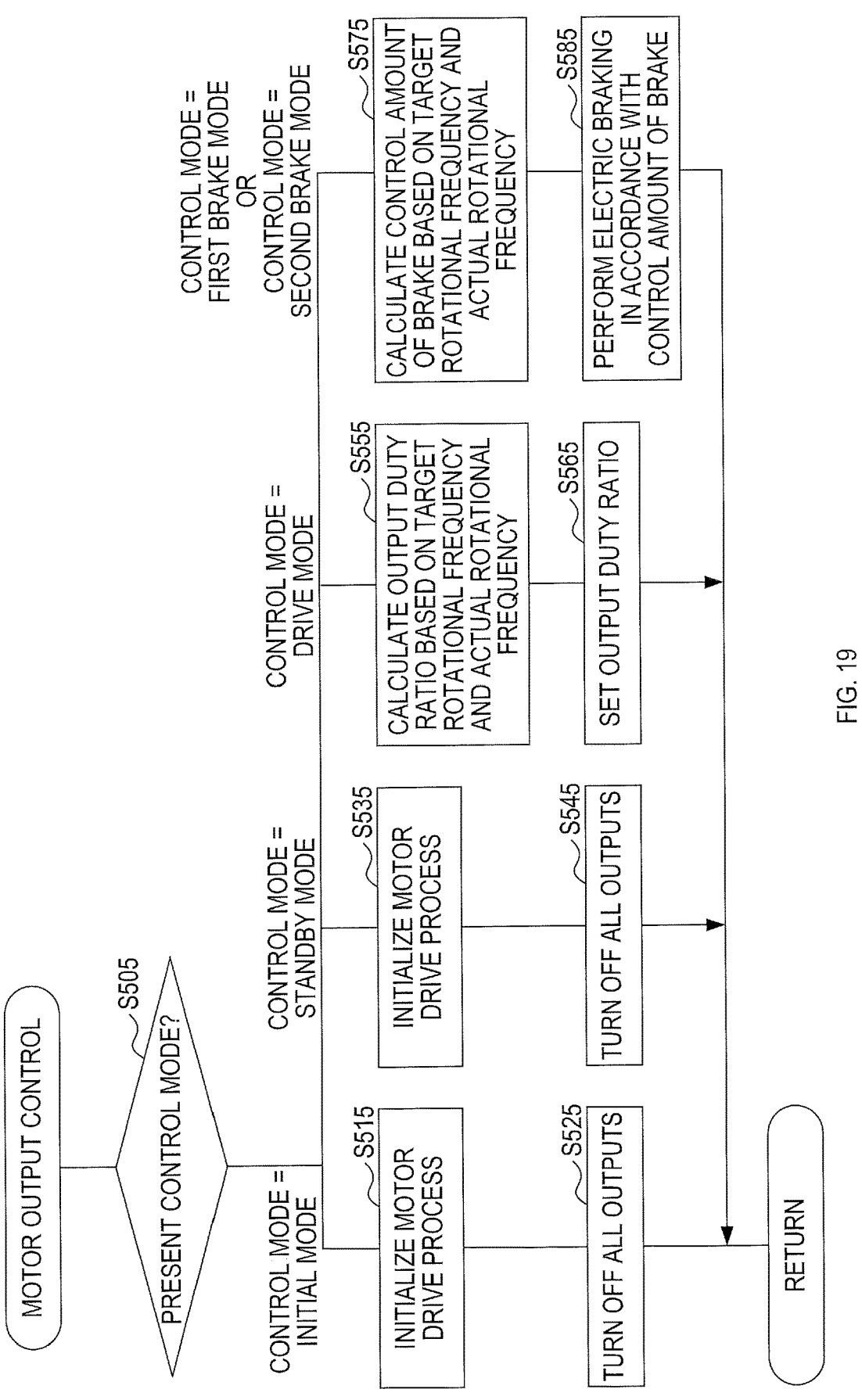
FIG. 19 is a flowchart showing a motor output control process according to the present embodiment.

Referring to a flowchart of FIG. 19, the motor output control process that the control circuit 120 executes in S265 will be described.

In S505, the control circuit 120 confirms the present control mode. The control circuit 120, when determining that the present control mode is the initial mode, proceeds to S515. The control circuit 120, when determining that the present control mode is the standby mode, proceeds to S535. The control circuit 120, when determining that the present control mode is the drive mode, proceeds to S555. The control circuit 120, when determining that the present control mode is the first brake mode or the second brake mode, proceeds to S575.

In S515, the control circuit 120 initializes a motor drive process. Specifically, the control circuit 120 initializes variables related to the motor drive process.

In S525, the control circuit 120 generates the control signal so that all outputs of the motor 400 are zero (0). The control circuit 120 outputs the generated control signal to the gate circuit 130, and ends the present process.

In S535, the control circuit 120 executes the same processing as that in S515.

In S545, the control circuit 120 executes the same processing as that in S525, and ends the present process.

In S555, the control circuit 120 executes a proportional-integral control based on a difference between the set target rotational frequency and the actual rotational frequency, and calculates an output duty ratio.

In S565, the control circuit 120 sets the output duty ratio calculated in S555 to the duty ratio of the PWM signal and generates the PWM signal. The control circuit 120 outputs the generated PWM signal to the gate circuit 130, and ends the present process.

In S575, the control circuit 120 calculates the control amount of the electric brake based on a difference between the set target rotational frequency and the actual rotational frequency, and calculates an output duty ratio.

In S585, the control circuit 120 performs electric braking in accordance with the control amount of the electric brake calculated in S575. Specifically, the control circuit 120 controls a conduction time of a two-phase short-circuit brake in accordance with the control amount of the electric brake. Thereafter, the control circuit 120 ends the present process.

<2-8. Notification Control Process>

Figure 20:
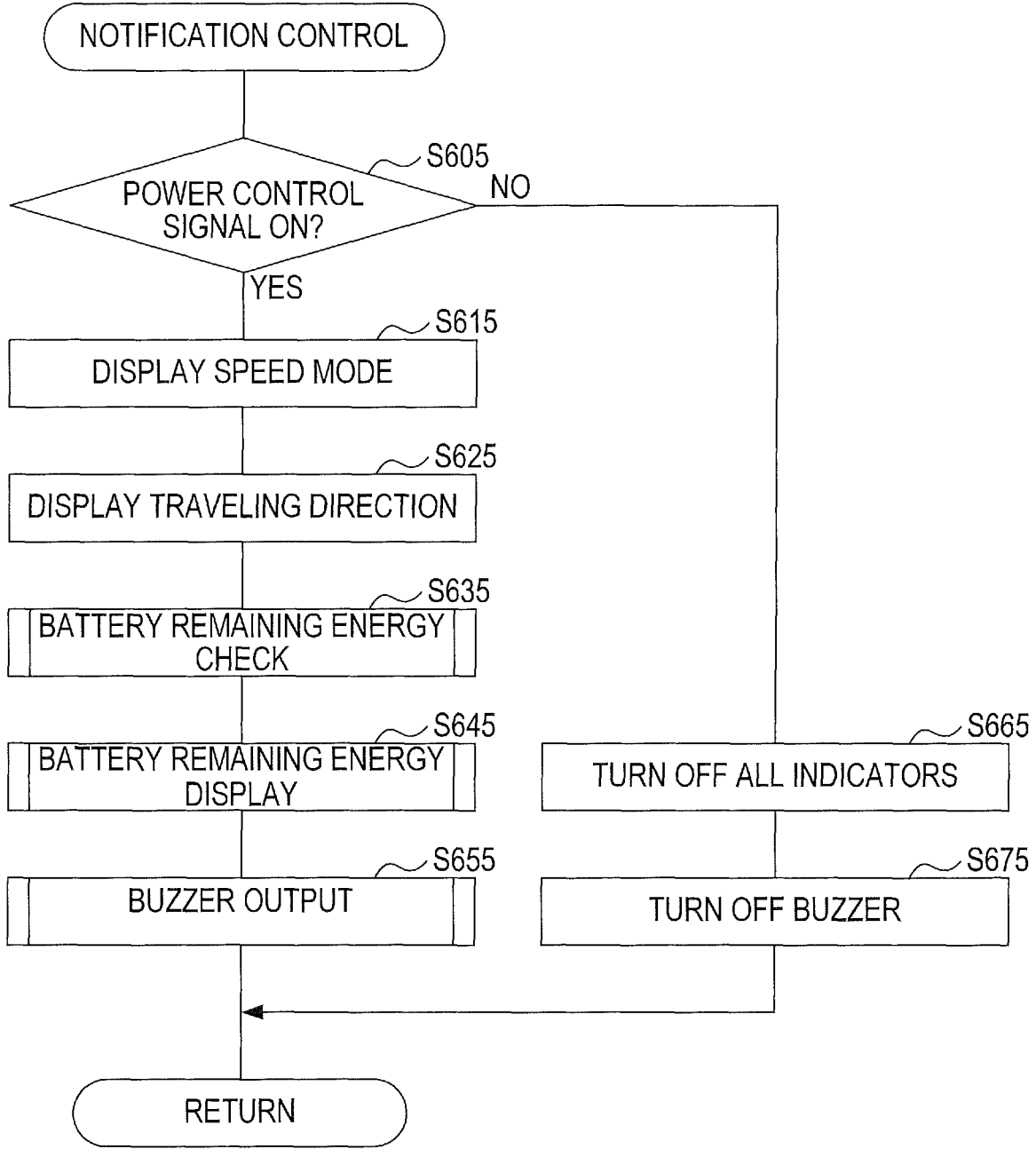
FIG. 20 is a flowchart showing a notification control process according to the present embodiment.

Referring to a flowchart of FIG. 20, the notification control process that the control circuit 120 executes in S100 will be described.

In S605, the control circuit 120 determines whether the power control signal is ON. The control circuit 120, when determining that the power control signal is ON (S605: YES), proceeds to S615. The control circuit 120, when determining that the power control signal is OFF (S605: NO), proceeds to S665.

In S615, the control circuit 120 executes a speed mode display process, and causes the speed mode indicator 97 to display the set speed mode.

In S625, the control circuit 120 executes a traveling direction display process, and causes the traveling direction indicator 95 to display the set traveling direction.

In S635, the control circuit 120 executes a battery remaining energy check process, and checks a battery remaining energy of each of the first to fourth battery packs 70A to 70D. The battery remaining energy check process will be described later in detail.

In S645, the control circuit 120 executes a battery remaining energy display process. The control circuit 120, when the remaining energy of any of the battery packs is low, causes a corresponding indicator to display a low remaining energy. The corresponding indicator is one of the first to fourth remaining energy indicators 72A to 72D, that displays the remaining energy of the battery pack with the low remaining energy. The battery remaining energy display process will be described later in detail.

In S655, the control circuit 120 executes a buzzer output process, and, when the battery remaining energy of any of the battery packs is low, causes the buzzer 68 to output a buzzer sound. Thereafter, the control circuit 120 ends the present process. The buzzer output process will be described later in detail.

In S665, the control circuit 120 turns OFF all the indicators of the battery-powered dolly 1.

In S675, the control circuit 120 sets the output of the buzzer 68 to OFF, and ends the present process.

<2-8-1. Battery Remaining Energy Check Process>

Figure 21:
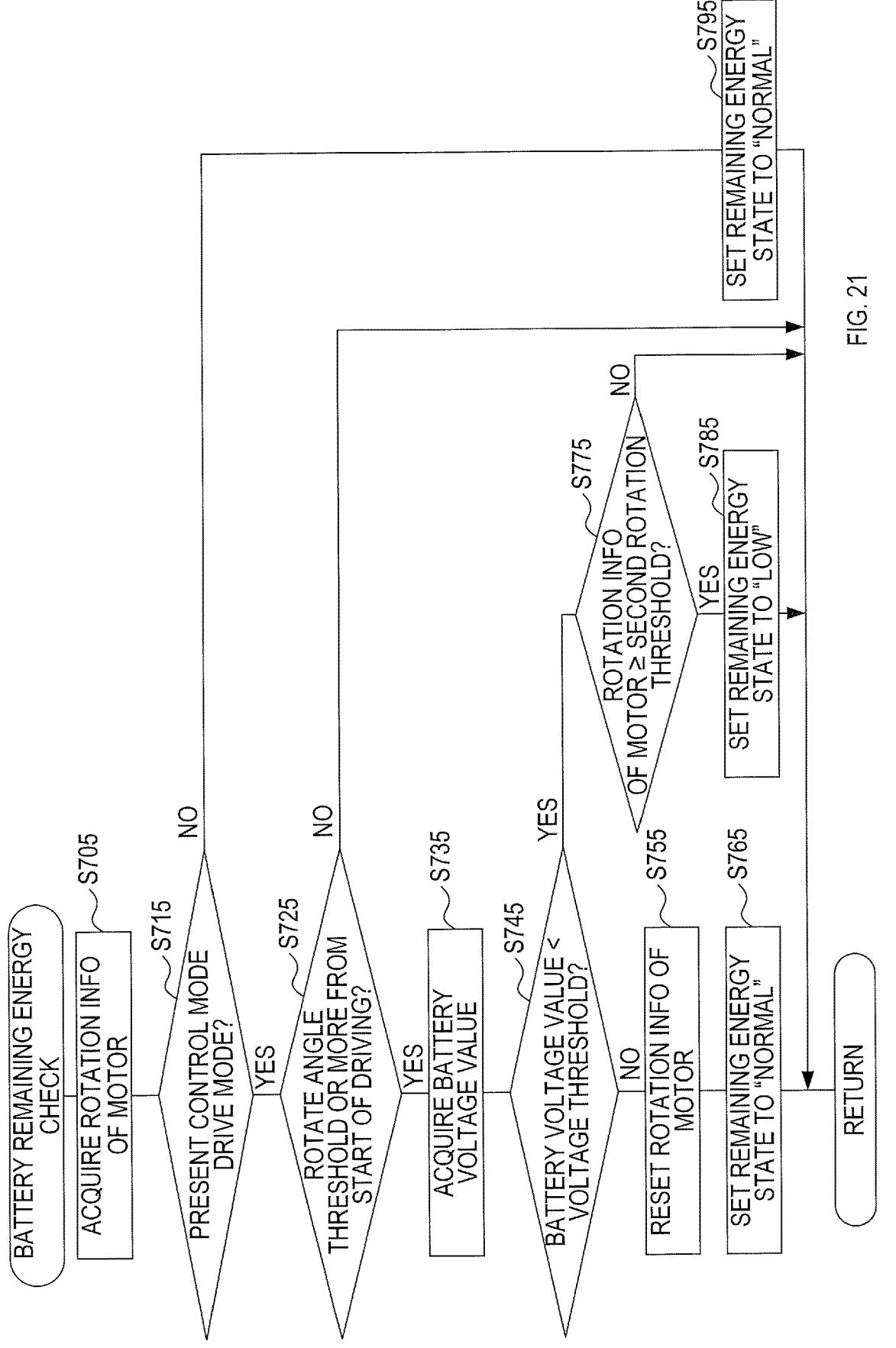
FIG. 21 is a flowchart showing a battery remaining energy check process according to the present embodiment.

Referring to a flowchart of FIG. 21, the battery remaining energy check process that the control circuit 120 executes in S635 will be described.

When the motor 400 is momentarily overloaded, the battery voltage can drop momentarily. In this case, the battery voltage recovers. Accordingly, if the battery-powered dolly 1 notifies the user of the momentary drop of the battery voltage, the user can be misled. Thus, the battery-powered dolly 1 notifies the user of the low battery remaining energy when a voltage drop of any of the first to fourth battery packs 70A to 70D is continuously detected while the front wheel 3 rotates by a specified angle. In the present process, the control circuit 120 checks the remaining energy of the first to fourth battery packs 70A to 70D while the front wheel 3 rotates by the specified angle.

In S705, the control circuit 120 executes the same processing as that in S660.

In S715, the control circuit 120 determines whether the present control mode is drive mode. The control circuit 120, when determining that the present control mode is drive mode (S715: YES), proceeds to S725. The control circuit 120, when determining that the present control mode is not drive mode (S715: NO), proceeds to S795.

In S725, the control circuit 120 determines whether the rotation angle of the motor 400 from a start of driving the motor 400 till the present time point is greater than or equal to an angle threshold. Immediately after the motor 400 starts to rotate, an inrush current causes a voltage drop. Here, the control circuit 120 determines whether the inrush current is flowing in order to avoid detection of a value of voltage including the voltage drop due to the inrush current. The angle threshold corresponds to a rotation angle at which it is determined that the inrush current has declined. The control circuit 120, when determining that the rotation angle is greater than or equal to the angle threshold (S725: YES), proceeds to S735. The control circuit 120, when determining that the rotation angle is smaller than the angle threshold (S725: NO), ends the present process.

In S735, the control circuit 120 acquires the voltage value of each of the first to fourth battery packs 70A to 70D.

In S745, the control circuit 120 determines whether each of the acquired voltage values is smaller than a voltage threshold. The control circuit 120, when determining that all the voltage values are greater than or equal to the voltage threshold (S745: NO), proceeds to S755. The control circuit 120, when determining that any of the voltage values is smaller than the voltage threshold (S745: YES), proceeds to S775.

In S755, the control circuit 120 resets the rotation information of the motor.

In S765, the control circuit 120 sets a remaining energy state of each of the first to fourth battery packs 70A to 70D to "normal". Thereafter, the control circuit 120 ends the present process.

In S775, the control circuit 120 determines whether the number of updates indicated by the rotation information of the motor is greater than or equal to a second rotation threshold. The second rotation threshold corresponds to a half turn of the front wheel 3 (that is, 180 degrees). The control circuit 120, when determining that the number of updates indicated by the rotation information of the motor is greater than or equal to the second rotation threshold (S775: YES), proceeds to S785. The control circuit 120, when determining that the number of updates indicated by the rotation information of the motor is smaller than the second rotation threshold (S775: NO), ends the present process.

In S785, the control circuit 120 sets the remaining energy state of the battery pack with the low remaining energy to "low". Thereafter, the control circuit 120 ends the present process. The battery pack with the low remaining energy corresponds to one of the first to fourth battery packs 70A to 70D, that has the voltage value smaller than the voltage threshold.

In S795, the control circuit 120 executes the same processing as that in S765, and ends the present process.

<2-8-2. Battery Remaining Energy Display Process>

Figure 22:
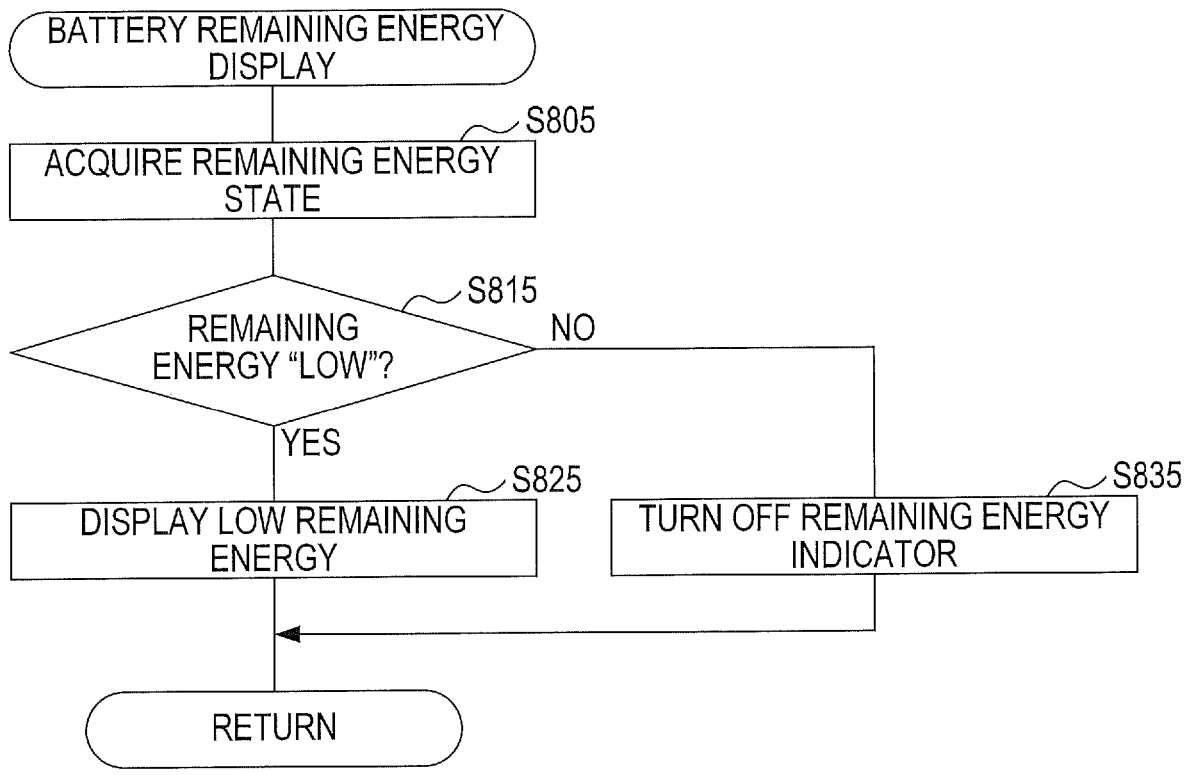
FIG. 22 is a flowchart showing a battery remaining energy display process according to the present embodiment.

Referring to a flowchart of FIG. 22, the battery remaining energy display process that the control circuit 120 executes in S645 will be described.

In S805, the control circuit 120 acquires the remaining energy state of each of the first to fourth battery packs 70A to 70D.

In S815, the control circuit 120 determines whether each of the remaining energy state is "low". The control circuit 120, when determining that any of the remaining energy states is "low" (S815: YES), proceeds to S825. The control circuit 120, when determining that all the remaining energy states are "normal" (S815: NO), proceeds to S835.

In S825, the control circuit 120 causes one of the first to fourth remaining energy indicators 72A to 72D, that corresponds to the battery pack with the low remaining energy to display the low remaining energy. For example, the control circuit 120 causes the corresponding remaining energy indicator to blink at a specified cycle to display the low remaining energy. Thereafter, the control circuit 120 ends the present process.

In S835, the control circuit 120 turns off the LEDs of the first to fourth remaining energy indicators 72A to 72D to turn OFF the first to fourth remaining energy indicators 72A to 72D. Thereafter, the control circuit 120 ends the present process.

<2-8-3. Buzzer Output Process>

Figure 23:
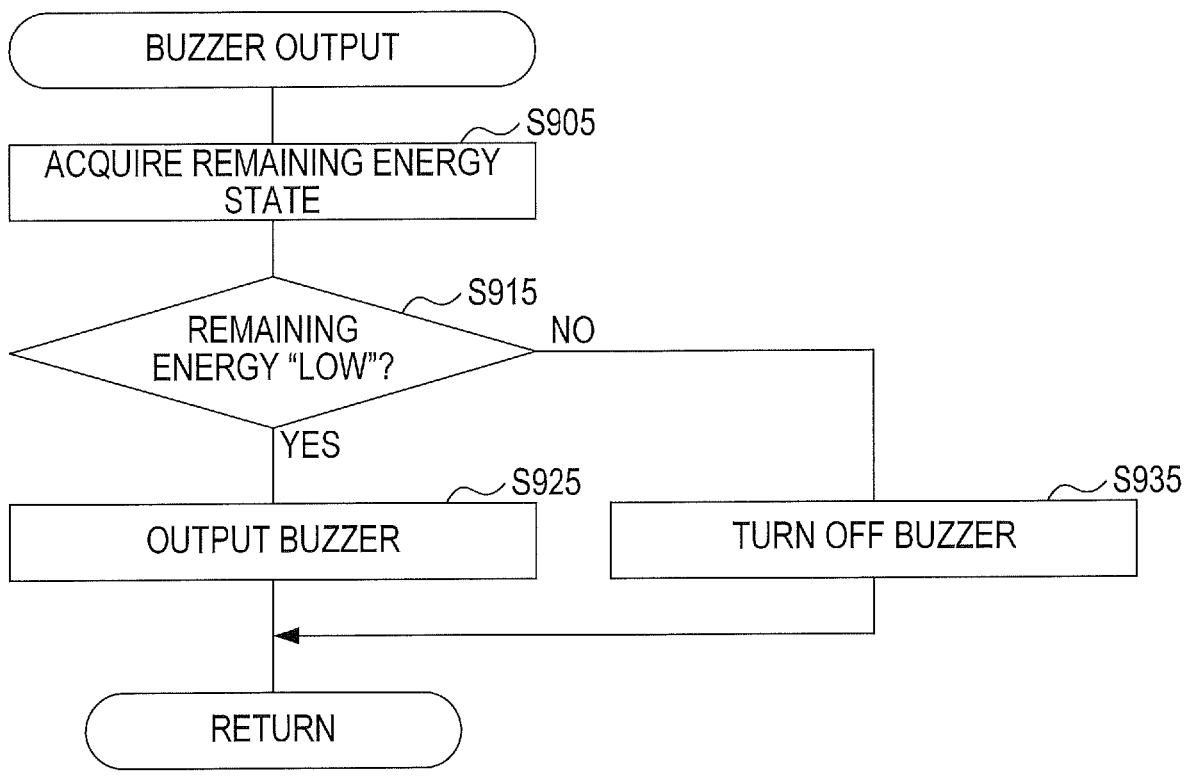
FIG. 23 is a flowchart showing a buzzer output process according to the present embodiment.

Referring to a flowchart of FIG. 23, the buzzer output process that the control circuit 120 executes in S655 will be described.

In S905 and S915, the control circuit 120 executes the same processing as those in S805 and S815.

In S925, the control circuit 120 outputs a buzzer sound from the buzzer 68 to notify the user that the remaining energy of any of the battery packs is low. For example, the control circuit 120 turns ON and OFF the buzzer 68 at a specified cycle so as to notify the user that the remaining energy of any of the battery packs is low. Thereafter, the control circuit 120 ends the present process.

In S935, the control circuit 120 turns OFF the buzzer 68, and does not cause the buzzer 68 to output a buzzer sound. Thereafter, the control circuit 120 ends the present process.

<3. Behavior>

<3-1. Behavior When Climbing a Slope>

Figure 26:
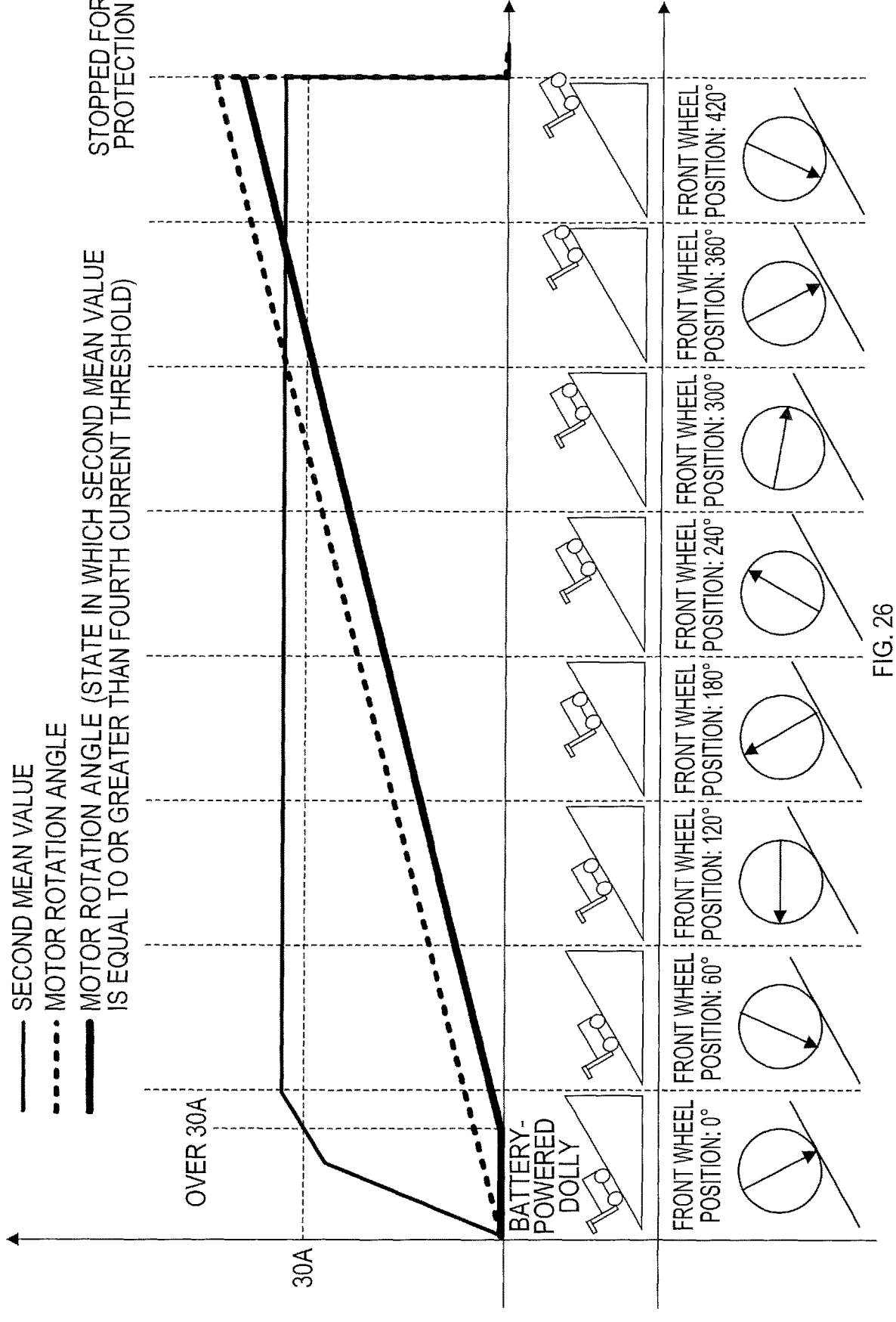
FIG. 26 is a diagram showing (i) change in a second mean value, (ii) change in a motor rotation angle, and (iii) change in the motor rotation angle when the second mean value is greater than or equal to a fourth current threshold, relative to a wheel position when the battery-powered dolly according to the present embodiment climbs a slope.

FIG. 26 shows changes in the second mean value Am, the first rotation angle, and the second rotation angle when the battery-powered dolly 1 climbs a slope with overloaded weight. The first rotation angle is the rotation angle of the motor 400 from when the motor 400 starts driving. The second rotation angle is the rotation angle of the motor 400 when the second mean value Am is greater than or equal to the fourth current threshold. The fourth current threshold is set to 30 A.

As shown in FIG. 26, when the front wheel 3 of the battery-powered dolly 1 climbs over the slope, the second mean value Am starts to increase. When the second mean value Am exceeds the fourth current threshold, the second rotation angle starts to increase. Then, when the second rotation angle continues to increase and the second rotation angle reaches an angle corresponding to one turn of the front wheel 3, the motor 400 is stopped. This allows the user to confirm that the load weight of the battery-powered dolly 1 is an unacceptable weight for the climbing task.

<3-2. Behavior When Climbing over a Step>

Figure 27:
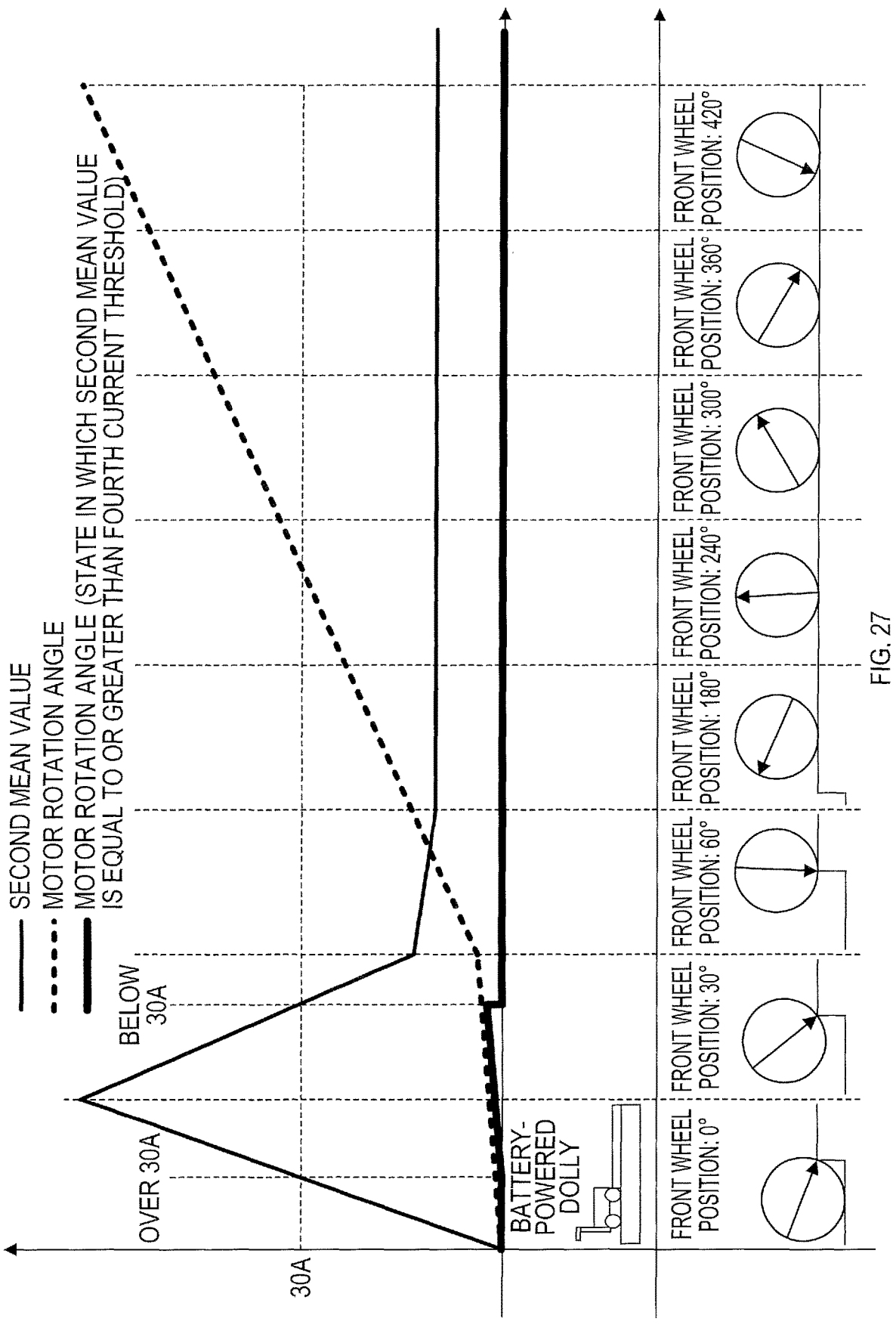
FIG. 27 is a diagram showing (i) change in the second mean value, (ii) change in the motor rotation angle, and (iii) change in the motor rotation angle when the second mean value is greater than or equal to the fourth current threshold, relative to the wheel position when the battery-powered dolly according to the present embodiment climbs over a step.

FIG. 27 shows changes in the second mean value Am, the first rotation angle, and the second rotation angle when the battery-powered dolly 1 climbs over a step with overloaded weight.

As shown in FIG. 27, when the front wheel 3 of the battery-powered dolly 1 climbs over the step, the second mean value Am increases and the second mean value Am exceeds the fourth current threshold. However, after the front wheel 3 climbs over the step, the second mean value Am starts to decrease. After the front wheel 3 starts to rotate on the step, the second mean value Am is almost constant. The second rotation angle starts to increase in response to the second mean value Am exceeding the fourth current threshold. However, the second mean value Am immediately falls below the fourth current threshold, and the second rotation angle returns to zero (0). Thus, the motor 400 is not stopped. In other words, the task with the battery-powered dolly 1 is not interfered.

<4. Effect>

The present embodiment detailed in the above has the following effects.

(1) The control circuit 120 executes the overload determination process and thus the motor 400 can be stopped when the overloaded battery-powered dolly 1 is climbing a slope. The control circuit 120 executes the overcurrent determination process and thus the motor 400 can be immediately stopped when the overcurrent is flowing through the motor 400. In addition, the user and the motor 400 can be properly protected both (i) when the overloaded battery-powered dolly 1 is climbing a slope and (ii) when the overcurrent is flowing to the motor 400.

(2) In the overcurrent determination process, when the motor 400 is continuously overloaded while the front wheel 3 rotates once, it is determined that the motor 400 is overloaded. This allows the control circuit 120 to accurately determine whether the motor 400 is overloaded while the overloaded battery-powered dolly 1 climbs a slope, excluding a case in which the motor 400 is momentarily overloaded.

(3) The user is notified that the remaining energy of any of the battery packs is low in response to the voltage value of the battery pack being continuously smaller than or equal to the voltage threshold while the front wheel 3 makes a half turn. This allows the user to confirm that the remaining energy of any of the battery packs is low when it is necessary to charge any of the battery packs.

Other Embodiments

Although the embodiment of the present disclosure is described in the above, the present disclosure is not limited to the aforementioned embodiment, and can be practiced in various forms.

(a) The control circuit 120, in the overcurrent determination process, may execute the determination in S540 based on the first mean value Ad instead of the battery current value Ib. The control circuit 120, in the overcurrent determination process, may execute the determination in S550 based on the second mean value Am instead of the estimated value Im. The control circuit 120 executes the determinations of both S540 and S550 in the overcurrent determination process, but may execute only one of the determinations.

(b) The control circuit 120, in the overload determination process, may execute the determination in S670 based on the battery current value Ib instead of the first mean value Ad. The control circuit 120, in the overload determination process, may execute the determination in S680 based on the estimated value Im instead of the second mean value Am. The control circuit 120 executes the determinations of both S670 and S680 in the overload determination process, but may execute only one of the determinations.

(c) The control circuit 120, in the overcurrent determination process, may execute the determination in S540 based on an accumulation counter instead of the battery current value Ib. The accumulation counter is an example of the first value. The control circuit 120 accumulates an addition value corresponding to the battery current value Ib at a specified cycle to calculate the accumulation counter. When the battery current value Ib is greater than a specified value, the addition value is a positive value. When the battery current value Ib is smaller than the specified value, the addition value is a negative value. Similarly, the control circuit 120, in the overload determination process, may execute the determination in S670 based on the accumulation counter instead of the first mean value Ad.

(d) In the aforementioned embodiment, the control circuit 120 detects the battery current value Id, and calculates the estimated value Im from the detected battery current value Id. However, the control circuit 120 may detect the battery current value Id, and also directly detect the estimated value Im. Alternatively, the control circuit 120 may detect the estimated value Im, and estimate the battery current value Id from the estimated value Im.

(e) The control circuit 120, in the overload determination process, may execute the determination in S670 based on the voltage value of the battery pack included in the battery set selected from the first and second battery sets. Specifically, the control circuit 120 may determine in S670 whether the voltage value is smaller than or equal to an overload voltage threshold, and, when the voltage value is smaller than or equal to the overload voltage threshold, may proceed to S690. In other words, the control circuit 120, when the voltage value is continuously smaller than or equal to the overload voltage threshold while the front wheel 3 continues to rotate by a specified angle, may stop the power supply from the selected battery set to the motor 400. The control circuit 120 can determine that the motor 400 is overloaded based on the voltage value instead of the first value, and stop the power supply to the motor 400. The overload voltage threshold corresponds to one example of a third threshold of the present disclosure.

(f) In the aforementioned embodiment, the control circuit 120 does not directly detect the rotational state of the front wheel 3, and detects the rotational state of the motor 400 that corresponds to the rotational state of the front wheel 3 by the position detection sensor 250. The present disclosure is not limited to this. As shown in FIG. 4A with the dashed line, the battery-powered dolly 1 may include a wheel speed sensor 280 mounted on a shaft 290 of the front wheel 3. The control circuit 120 may use the wheel speed sensor 280 to directly detect the rotation speed of the front wheel 3. In this case, the control circuit 120 may determine in S690 of the overload determination process whether the detected rotation angle of the front wheel 3 is one turn (that is, 360 degrees) or more. The control circuit 120 may determine in S775 of the battery remaining energy check process whether the detected rotation angle of the front wheel 3 is a half turn (that is, 180 degrees) or more.

(g) The motor 400 may be a brushed motor. In this case, since the position detection sensor 250 is not provided, a rotation sensor may be mounted on the shaft 290 of the front wheel 3, and the rotational state of the front wheel 3 may be directed detected. Alternatively, the motor 400 may be a sensorless motor which does not use a detection signal of a Hall element. In this case, the control circuit 120 may calculate the actual rotational frequency of the motor 400 based on the induced voltage generated in the winding of the motor 400 and the motor current.

Figure 11:
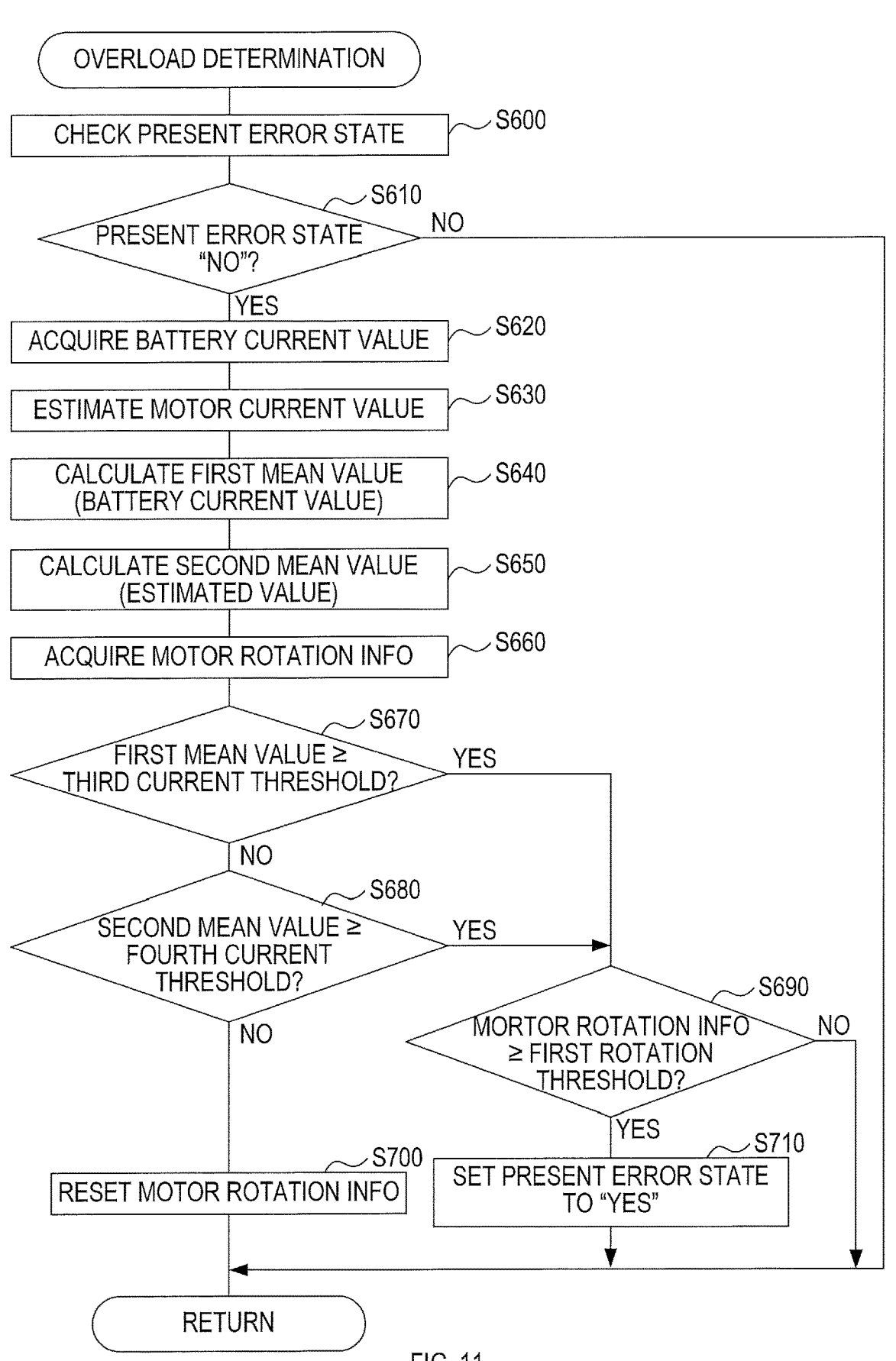
FIG. 11 is a flowchart showing an overload determination process according to the present embodiment.

(h) In the aforementioned embodiment, the control circuit 120, in the overload determination process shown in FIG. 11, determines that the motor 400 is overloaded based on the battery current value Ib, the motor current value Im, and the rotation information, and stops power supply from the battery pack to the motor 400. However, the control circuit 120 may determine that the motor 400 is overloaded in other ways. For example, the control circuit 120, in a constant rotation control of the motor 400, may determine that the motor 400 is overloaded when a reduced amount continues to be greater than or equal to a reduction threshold while the front wheel 3 continuously rotates by a specified angle. The constant rotation control is a control to maintain the actual rotational frequency of the motor 400 at the target rotational frequency. The reduced amount is an amount of the actual rotational frequency reduced relative to the target rotational frequency.

(i) The control circuit 120, in the constant rotation control of the motor 400, may determine that the motor 400 is overloaded when an increased amount continues to be greater than or equal to an increase threshold while the front wheel 3 continuously rotates by a specified angle. The increased amount is an amount of a second input voltage value increased relative to a first input voltage value. The first input voltage value is a value of input voltage required to maintain the actual rotational frequency at the target rotational frequency when the battery-powered dolly 1 travels on flat ground. The second input voltage value is a value of voltage actually input to the motor 400.

(j) A plurality of functions performed by a single element in the above-described embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. Moreover, at least a part of a configuration in the above-described embodiments may be added to, or may replace, another configuration in the above-described embodiments.

What is claimed is:

1. A battery-powered dolly comprising:
 a handle configured to be gripped by a user of the battery-powered dolly;
 a connector configured to be electrically connected to a battery;

a motor configured to receive an electric power from the battery connected to the connector and rotate;
 a wheel configured to be driven by the motor;
 a detector configured to detect a battery current value, the battery current value corresponding to a magnitude of an electric current flowing from the battery;
 a rotation information acquirer configured to acquire a rotation information, the rotation information indicating a rotational state of the wheel; and
 a controller configured to control the motor,
 the controller being configured to stop supplying the electric power to the motor based on a first requirement or a second requirement being satisfied,
 the first requirement being satisfied in response to a first value based on the battery current value continuing to be greater than or equal to a first threshold while the wheel continuously rotates by a first angle, and
 the second requirement being satisfied in response to a second value based on the battery current value being greater than or equal to a second threshold, the second threshold being greater than the first threshold.

2. The battery-powered dolly according to claim 1, wherein the first angle is greater than 360 degrees.

3. The battery-powered dolly according to claim 1, wherein the controller is further configured to determine whether the wheel continuously rotates by the first angle based on the rotation information acquired by the rotation information acquirer.

4. The battery-powered dolly according to claim 1, wherein
 the controller is further configured to:
  repeatedly acquire the battery current value detected by the detector; and
  repeatedly calculate a first mean value, the first mean value corresponding to an average of a series of battery current values repeatedly acquired over a first period of time; and
 the first value corresponds to each of a series of first mean values repeatedly calculated.

5. The battery-powered dolly according to claim 1, wherein
 the controller is further configured to:
  repeatedly acquire the battery current value detected by the detector; and
  repeatedly estimate a motor current value based on a series of battery current values repeatedly acquired, the motor current value corresponding to a magnitude of an electric current flowing through the motor; and
 the first value corresponds to each of a series of motor current values repeatedly estimated.

6. The battery-powered dolly according to claim 1, wherein
 the controller is further configured to:
  repeatedly acquire the battery current value detected by the detector;
  repeatedly estimate a motor current value based on a series of battery current values repeatedly acquired, the motor current value corresponding to a magnitude of an electric current flowing through the motor; and
  repeatedly calculate a motor current second mean value, the motor current mean value corresponding to an average of a series of motor current values repeatedly estimated over a first period of time; and
 the first value corresponds to each of a series of motor current mean values repeatedly calculated.

7. The battery-powered dolly according to claim 1, wherein the rotation information acquirer includes a position detection sensor, the position detection sensor is configured to (i) detect a rotational position of the motor and (ii) output a first signal to the controller, the first signal (i) corresponding to the detected rotational position of the motor and (ii) including the rotation information.

8. A battery-powered dolly comprising:

a handle configured to be gripped by a user of the battery-powered dolly;

a connector configured to be electrically connected to a battery;

a motor configured to receive an electric power from the battery connected to the connector and rotate;

a wheel configured to be driven by the motor;

a detector configured to detect a battery voltage value, the battery voltage value corresponding to a magnitude of an output voltage of the battery;

a rotation information acquirer configured to acquire a rotation information, the rotation information indicating a rotational state of the wheel; and a controller configured to control the motor, the controller being configured to (i) repeatedly acquire the battery voltage value detected by the detector and (ii) stop supplying the electric power to the motor based on each of a series of battery voltage values repeatedly acquired being smaller than or equal to a set threshold while the wheel continuously rotates by a first angle.

9. The battery-powered dolly according to claim 8, wherein the first angle is greater than 360 degrees.

10. A battery-powered dolly comprising:

a handle configured to be gripped by a user of the battery-powered dolly;

a connector configured to be electrically connected to a battery;

a motor configured to receive an electric power from the battery connected to the connector and rotate;

a wheel configured to be driven by the motor;

a detector configured to detect a battery voltage value, the battery voltage value corresponding to a magnitude of an output voltage of the battery;

a rotation information acquirer configured to acquire a rotation information, the rotation information indicating a rotational state of the wheel;

a controller configured to control the motor; and a notifier configured to notify the user of low remaining energy of the battery, the controller being configured to (i) repeatedly acquire the battery voltage value detected by the detector and (ii) notify the user of the low remaining energy via the notifier based on each of a series of battery voltage values repeatedly acquired being smaller than or equal to a set threshold while the wheel continuously rotates by a specified angle.

11. The battery-powered dolly according to claim 10, wherein the notifier includes a buzzer.

12. The battery-powered dolly according to claim 10, wherein the notifier includes a light emitting diode.

13. A battery-powered dolly comprising:

a handle configured to be gripped by a user of the battery-powered dolly;

a connector configured to be electrically connected to a battery;

a motor configured to receive an electric power from the battery connected to the connector and rotate;

a wheel configured to be driven by the motor;

a detector configured to detect a battery current value and/or a battery voltage value, the battery current value corresponding to a magnitude of an electric current flowing from the battery, the battery voltage value corresponding to a magnitude of an output voltage of the battery;

a rotation information acquirer configured to acquire a rotation information, the rotation information indicating a rotational state of the wheel;

a controller configured to control the motor; and a shaft coupled to the wheel, the controller being configured to stop supplying the electric power from the battery to the motor based on (i) the battery current value and/or the battery voltage value detected by the detector and (ii) the rotation information acquired by the rotation information acquirer, the rotation information acquirer including a wheel speed sensor mounted on the shaft, and the wheel speed sensor being configured to (i) detect a rotational position of the wheel and (ii) output a position signal to the controller, the position signal (i) corresponding to the detected rotational position of the wheel and (ii) including the rotation information.

* * * * *